United States Patent [19]

Narayan et al.

[11] Patent Number: 5,869,647
[45] Date of Patent: Feb. 9, 1999

[54] METHOD OF PREPARING BIODEGRADABLE MODIFIED-STARCH MOLDABLE PRODUCTS AND FILMS

[75] Inventors: Ramani Narayan, Okemos; Steven Bloembergen, South Lyon; Amit Lathia, Lansing, all of Mich.

[73] Assignee: Evercorn, Inc., Lansing, Mich.

[21] Appl. No.: 97,550

[22] Filed: Jul. 27, 1993

[51] Int. Cl.$^6$ ............................. C08B 31/04; D21H 27/00
[52] U.S. Cl. ......................... 536/107; 536/102; 536/110; 536/124
[58] Field of Search ................................ 536/18.6, 18.5, 536/102, 107, 115, 124, 110; 428/35.6

[56] References Cited

U.S. PATENT DOCUMENTS

| | | | |
|---|---|---|---|
| 2,372,337 | 3/1945 | Pacsu et al. | 536/110 |
| 2,412,213 | 12/1946 | Groen | 536/110 |
| 2,589,226 | 3/1952 | Carson | 536/110 |
| 2,627,516 | 2/1953 | Lohmar | 536/110 |
| 3,326,893 | 6/1967 | Moshy | 536/110 |
| 3,720,662 | 3/1973 | Tessler et al. | 536/110 |
| 3,795,670 | 3/1974 | Mark et al. | 536/110 |
| 3,839,320 | 10/1974 | Bauer | 536/110 |
| 4,011,392 | 3/1977 | Rudolph et al. | 536/110 |
| 4,061,610 | 12/1977 | Glowaky et al. | 536/110 |
| 4,129,722 | 12/1978 | Iovine et al. | 536/110 |
| 4,387,221 | 6/1983 | Tessler et al. | 536/107 |
| 4,501,888 | 2/1985 | Schmidt | 536/107 |
| 4,863,655 | 9/1989 | Lacourse et al. | 264/53 |
| 4,891,404 | 1/1990 | Narayan et al. | 525/54.2 |
| 5,026,745 | 6/1991 | Weil | 524/47 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |
| 5,153,037 | 10/1992 | Altieri | 428/35.6 |
| 5,205,863 | 4/1993 | Elion | 106/154.1 |
| 5,272,191 | 12/1993 | Ibrahim et al. | 524/35 |
| 5,288,318 | 2/1994 | Mayer et al. | 106/213 |
| 5,367,067 | 11/1994 | Frische et al. | 536/45 |

FOREIGN PATENT DOCUMENTS

| | | |
|---|---|---|
| 2030852 | 11/1990 | Canada . |
| 0408501 | 5/1990 | European Pat. Off. . |
| 0408502 | 5/1990 | European Pat. Off. . |
| 0409781 | 12/1990 | European Pat. Off. . |
| 0409782 | 12/1990 | European Pat. Off. . |
| 2205569 | 3/1988 | United Kingdom . |
| 9214782 | 3/1992 | WIPO ............................... C08L 3/02 |

OTHER PUBLICATIONS

Narayan, "Compatibilization of Lignocellulosics with Plastics," in *Emerging Technologies for Materials and Chemicals from Biomass* ACS Symposium, Amer. Chem. Soc., Aug. 26–31, 1990, pp. 57–75 (1992).

Narayan, "Preparation of Corn–Based Plastics for Material Applications" First Annual Corn Utilization Conference, Jun. 11 & 12, 1987, pp. 209–220 (1987).

Stacy et al., Biodegradable Natural–Synthetic Polymer Graft Copolymers, *Antec*, pp. 1362–1364 (1989).

Narayan and Neu, "Composite Systems of Lignocellulosics with Synthetic Polymers", *Mat. Res. Soc. Symp. Proc.* 197:55–66 (1990).

Jarowenko, "Acetylated Starch and Miscellaneous Organic Esters", in *Modified Starches: Properties and Uses* (Wurzburg, ed.) CRC Press, Florida, Chapter 4 (1986).

Mullen and Pacsu, "Possible Industrial Utilization of Starch Esters" *Ind. Eng. Chem.*, 35:381–384 (1943).

Swanson et al., "Starch–Plastic Materials–Prep., Physical Prop., and Biodegradability", *J. Environ. Polymer Degrad.*, 35:155–166 (1993).

Wolff et al., "Triesters of Corn Starch, Amylose, and Amylopectin", *Ind. Eng. Chem.*, 43:911–914 (1951).

Rivard et al., "Effects of Natural Polymer Acetylation on Anaerobic Bioconversion to Methane and Carbon Dioxide", *Appl. Biochem.* Biotechnol, 34/35:725–735 (1992).

Mullen and Pacsu, "Starch Studies, Prep. and Properties of Starch Triesters", *Ind. Eng. Chem.*, 34:1209–1217 (1942).

Higginbotham and Richardson, "The Effect of Acetylation on Molecular Chain–Length of Starch", *J. Soc. Chem. Ind.*, 57:234–240 (1938).

Mark and Mehltretter, "Facile Preparation of Starch Triacetates", *Starch/Die Stark*, 24:73–76 (1972).

Gilmore et al., "The fate of 'biodegradable' plastics in municipal leaf compost", *J. Industr. Microbiol*, 10:199–206 (1992).

Barak et al., "Biodegradability of Polyhydroxybutyrate (co–hydroxy–valerate) and Starch–Incorporated Polyethylene Plastic Films in Soils" *J. Env. Qual.* 20:173–179 (1991).

Krupp and Jewell, "Biodegradability of Modified Plastic Films in Controlled Biological Environments", *Environ. Sci. Technol.*, 26:193–197 (1991).

Narayan, "Biodegradation of Polymeric Materials (Anthropogenic Macromolecules) During Composting", Proceedings: Int. Composting Research Symposium, Columbus, Ohio, May 27–29, 1992.

Tanghe, "Determination of Acetyl Content and Degree of Substitution of Cellulose Acetate", in *Methods in Carbohydrate Chemistry*, (R. Whistler, editor) Academic Press, NY, 3:201–203 (1964).

Code of Federal Regulations, Title 21, Chap. 1, Part 172, (1981) Food Additives Permitted in Food for Human Consumption, Section 172, 892, Food Starch–Modified, U.S. Gov. Ptg Office, Wash. DC pp. 23,24,92–94.

Primary Examiner—Marian C. Knode
Assistant Examiner—Howard C. Lee
Attorney, Agent, or Firm—Quarles & Brady

[57] ABSTRACT

A method of preparing biodegradable moldable products and films includes the steps of preparing biodegradable, hydrophobic, modified starch, and forming a thermoplastic product, comprising the modified starch, and optionally a miscible and biodegradable plasticizer, and/or a compatible filler.

6 Claims, 8 Drawing Sheets

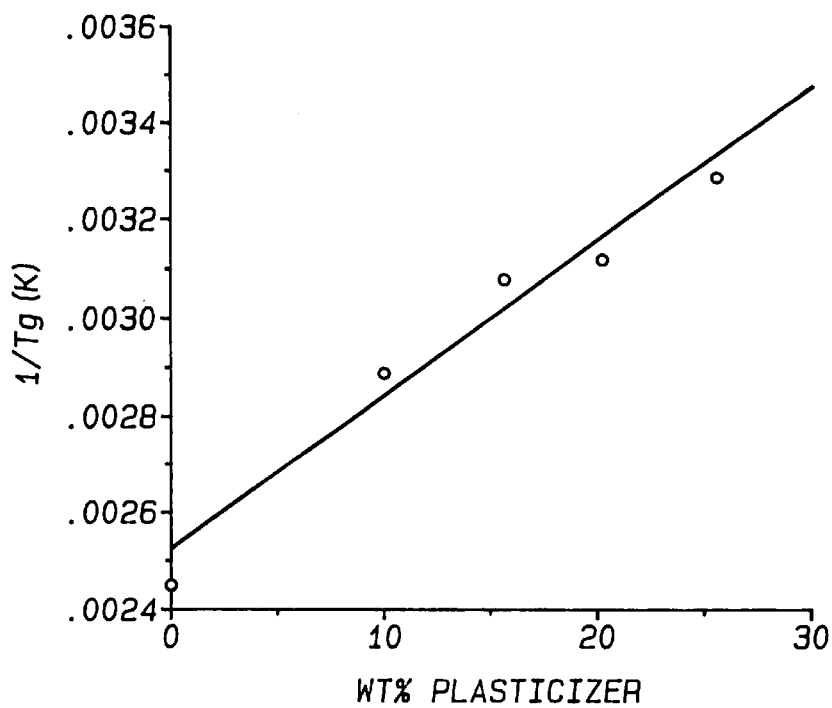
FIG. 7
FIG. 8
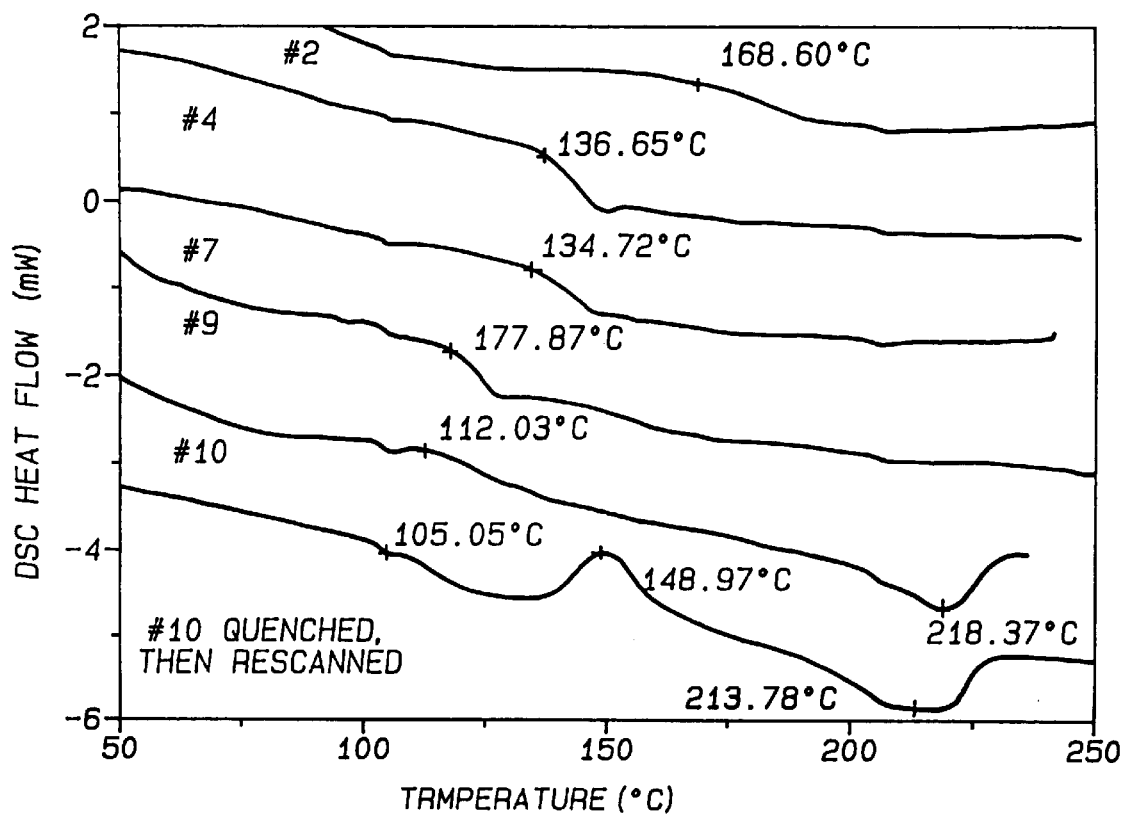

METHOD OF PREPARING BIODEGRADABLE MODIFIED-STARCH MOLDABLE PRODUCTS AND FILMS

TECHNICAL FIELD

This invention relates to the preparation of moldable products and films based on thermoplastic modified starch. More specifically, the present invention relates to a process of starch modification resulting in a hydrophobic product and the products made from the invented process.

BACKGROUND OF THE INVENTION

Traditionally, plastics have been formulated to result in strong, light-weight, durable, and bioresistant polymeric materials. It is the durability and indestructibility that makes plastic the material of choice for many applications. However, these same properties are problems when the plastics enter the waste stream. The recent trend is to create biodegradable plastics, most of such plastics being first commercialized in the mid 1980's.[1]

Among the first biodegradable plastics made were blends of non-biodegradable polyolefins with starch which were at best only partially biodegradable. These plastics are not compatible with waste management infrastructures such as composting. Moreover, at that time the appropriate infrastructures capable of dealing with biodegradables did not exist. Instead of composting, these products generally ended up in sanitary landfills.

Landfills, in general, are a poor choice as a repository of plastic and organic waste. The landfills are plastic-lined tombs designed to retard biodegradation by providing little or no moisture with negligible microbial activity. Organic waste, such as lawn and yard waste, paper, and food waste should not be entombed in such landfills to be preserved for posterity. Accordingly, there is a growing trend to divert these materials into composting facilities which allow them to be biodegraded to produce humus or compost. This compost can then be used as a valuable soil additive for new plant growth.

When plastics are designed to be biodegradable, utilizing renewable resources as the major raw material component, the plastics can become part of an ecologically sound mechanism.

Biodegradation of such natural materials produces valuable compost as the major product, in addition to water and carbon dioxide. Such carbon dioxide is fixed, or neutral carbon dioxide, and therefore does not contribute to an increase in the greenhouse gases.

Rowell, Schultz and Narayan published a book on the emerging technologies from materials and chemicals from biomass.[2] In the first chapter of that book, Narayan discusses the need for environmentally compatible polymers based on renewable resources. In that book is included a discussion of tailor-made cellulose-polystyrene graft polymers which were used as compatibilizers/interfacial agents to prepare cellulosic-polystyrene alloys and wood-plastic alloys (Ch. 5, pp 57–75).[2] The graft copolymers function as emulsifying agents and provide for a stabilized, fine dispersion of the polystyrene phase in the continuous phase of the cellulosic matrix.

U.S. Pat. No. 4,891,404 to Narayan et al.[3] discusses a specific nucleophilic displacement reaction used to prepare such graft polymers which are disclosed to be biodegradable thermoplastic copolymers exhibiting a high capacity for stabilized biodegradable blends of polysaccharides and synthetic thermoplastic polymers. The patent discusses the problems relating to the making of cellulose/starch natural biopolymers and the problem of controlling the molecular weights and degree of substitution of such polymers. Earlier papers by Narayan and Stacy et al.[4,5] further discuss biodegradable natural/synthetic graft copolymers.

U.S. Pat. No. 5,095,054 to Lay et al.,[6] issued Mar. 10, 1992, discloses the use of water as a plasticizer for starch (referred to as starch "destructurization") in order to make the material processable in for example an extruder. Products derived therefrom, tend to have the problem of rapidly losing water to the environment by evaporation. As a result this type of material tends to become brittle with age. These materials are also highly water sensitive which is undesirable for the majority of applications of thermoplastic products.

To address this issue of water sensitivity, the patent includes various blends of destructurized starch with a variety of synthetic petroleum-based plastics. These lends, along with the earlier starch-filled polyolefins, are at best only biodisintegratable and not fully biodegradable.[12,31-33] Similar starch-polyolefin compositions have been reported by the Fertec group.[7]

The U.S. Pat. No. 4,863,655 to Lacourse et al.,[8] issued Sep. 5, 1989, discloses water-soluble high amylose starch based compositions containing poly(vinyl alcohol). This biodegradable modified starch product intended for loose fill, or "peanut-shell"-type foam packaging applications, for example, contains a hydroxy propylated starch having a very low degree of substitution. This type of modified starch is highly hydrophilic and water soluble; the starch contains about 5% by weight propylene oxide corresponding to a theoretical degree of substitution of 0.19. This is a very low degree of substitution compared with the maximum degree of substitution for starch which is 3.0 according to the three available hydroxyl groups on the anhydroglucose repeat unit. The poly(vinyl alcohol) typically used as a blend component further adds to the water-sensitive nature of these materials. In the case of peanut-shell packaging, the water solubility of such starch-based foams is in fact a positive as this allows the material to be disposed of in an environmentally friendly fashion by simply washing them with water down the drain; the material subsequently biodegrades in the sewer system. For other applications, however, which utilize moldable compositions for various packaging applications, fast food cutlery, plates, cups, etc., the need for moisture resistance is of ultimate importance.

The prior art on biodegradable materials is restricted to starch-based materials in which the starch component is hydrophilic (water sensitive). No prior art exists on making hydrophobic, thermoplastic modified starches as fully biodegradable products which are readily processable on conventional plastics processing equipment such as extruders, injection molders, etc. There are a number of patents and publications in the literature relating to modification of starch by esterification and etherification reactions. Most commercial modified starch products have low degree of substitution (DS) levels, are generally made by reactions in water with excess anhydride, and are designed to alter their solution properties for food applications or adhesion to paper. Acetylated starches, for example, have been known for more than 100 years. Starch acetates ranging from about 0.3 to about 1 DS are typified by water solubility.[9] Starch esters which are commercially available for consumption, used for example in salad dressings, have a degree of substitution which typically is lower than 0.1 DS. For example, starch succinate derivatives are cleared for food use by the U.S. Food and Drug Administration (FDA) up to a 4% treatment level, which is equivalent to 0.07 DS.[10]

Highly acetylated starches, historically, were of some interest because of their organic solvent solubility and their thermoplasticity for film and fiber applications analogous to thermoplastic cellulose esters. In spite of this early development, high DS starch esters have not been developed commercially because they could not compete with similar cellulose derivatives in terms of strength and cost.[9] Of primary focus were starch triesters, which fell short in strength and impact properties.[11,12] Such high-DS starch esters are characterized by their crystalline properties exhibiting clear melt transitions.[13] These high-DS starch esters are not biodegradable. Rivard et al. showed that under anaerobic conditions starch esters above substitution levels of DS=1.7 were not biodegradable.[14] We have obtained similar results in our laboratory under composting conditions.

In the present invention, we have designed starch esters with the appropriate degree of substitution, prepared by a unique homogeneous base-catalyzed system under anhydrous conditions, that allows us to obtain starch ester compositions having good mechanical properties while maintaining complete biodegradability. This requires starch ester compositions described in the present invention, to have an intermediate degree of substitution, preferably ranging from 0.4 to 2.5 DS, more preferably from 1.0 to 2.0, and most preferably from 1.2 to 1.7 DS. The latter range of compositions have the most preferred balance in mechanical properties, water resistance, processability and the rate of biodegradation. The starch esters prepared by the present invention are predominately amorphous polymers; little or no residual native starch crystallinity remains due to the homogeneous modification process employed. Without being restrictive, the absence of a new crystalline structure for the starch esters produced by this process relates to the range of intermediate degrees of substitution to give non-crystalline copolymers. High DS starch triesters approach the structure of a homopolymer having the needed macromolecular chain regularity required for crystallization. By designing starch esters of intermediate degree of substitution, prepared in a homogenous modification process, the placement of ester groups on the anhydroglucose repeat units is expected to follow a statistically random distribution pattern. This results in irregular macromolecular chains, giving rise to novel amorphous thermoplastics with unique properties.

In addition, most high DS starch ester preparations in the prior art,[15-22] involve aqueous heterogeneous systems with excess anhydride, resulting in broad DS distribution profiles and therefore poor mechanical properties and poor moisture resistance. The economics of such processes are unfavorable due to hydrolysis of the anhydride, whereas high yields are obtained in the present invention which employs anhydrous conditions. The use of organic solvents such as organic acids,[23] or dimethyl sulfoxide with sulfuric acid catalyst,[24] is also reported in the prior art, although molecular weight breakdown of the starch and starch ester products is inevitable under those conditions.[25,26]

The present invention achieves good processability and mechanical properties by controlling the degree of substitution and molecular weight of the product. When anhydride is used as the esterification reagent, molecular weight breakdown of starch and starch esters is minimized by addition of a neutralizing agent to the reaction mixture. The control of molecular weight is achieved by neutralization of the acid by-product throughout the reaction in an excess of the neutralizing agent. This is in contrast with prior art high DS starch esters which either yielded degraded products[25,26] having significantly reduced molecular weights and consequently reduced mechanical properties, or utilized processes which are commercially unattractive due to high solvent recovery costs as well as issues regarding toxicity and safety as in the case of pyridine.[16,25-29] In another method, claimed to be commercially more attractive than the pyridine-based process described the art prior to 1972, a 212% molar excess of acetic anhydride was used to acetylate starches to high substitution levels.[15,30] In contrast, in the present invention high yields (up to 96%) are obtained using equimolar levels of anhydride relative to starch hydroxyl moieties. Without being restrictive, this improvement is attributed to the highly effective acylation catalyst and anhydrous conditions. Prior art[15-30] reveals significant hydrolysis of the anhydride reagent to occur due to the relatively high water levels present during the reaction. Furthermore, the absence of incomplete starch granule destruction, as clearly evidenced in the literature,[30] indicates that these types of processes result in heterogeneous starch substitution. The homogeneous base-catalyzed process employed in the present invention, affords starch esters having a more uniform and narrow substitution profile than prior art.

This control of substitution and molecular weight results in starch ester compositions having good moisture resistance and excellent mechanical properties, not obtained with the previous inventions.

A key aspect of this invention is that these compositions are fully biodegradable (complete mineralization), as opposed to blends of biodegradable starch compositions with conventional petroleum-based plastics described earlier.[12,31-33] As discussed, such blend compositions are at best biodisintegratable and not fully biodegradable. In composting, the non-biodegradable components will be persistent resulting in an irreversible build-up of these components in the environment causing reduced productivity and fertility of the soil.[34] Even if such "biodegradable" blend compositions, described in the prior art, are partially biodegradable, the resulting compost will have very little value. In fact, these recalcitrant components will be present in the final compost at significantly higher concentration levels than in the original waste mixture.[34]

SUMMARY OF THE INVENTION AND ADVANTAGES

In accordance with the present invention, there is provided biodegradable products made by preparing a biodegradable modified starch and forming a hydrophobic modified starch molded product or film product.

The present invention provides a method for obtaining amorphous, high molecular weight, thermoplastic modified-starch products with controlled degree of substitution, optionally containing a miscible biodegradable plasticizer, and/or a compatible filler. The plasticizer is selected from the group including a variety of biodegradable esters miscible with the starch esters. Compounding with compatible additives, preferably talc and similar inorganic structural fillers, provides added compositions of matter with unusually increased strength and modulus. These products are readily processable, water resistant, and have good mechanical properties. Most importantly, the polymers are fully biodegradable and after their end-use can be composted to produce valuable soil amendment.

BRIEF DESCRIPTION OF THE FIGURES

Other advantages of the present invention will be readily appreciated as the same becomes better understood by reference to the following detailed description when considered in connection with the accompanying drawings wherein:

FIG. 7 is a graph showing the effect of triacetin on the glass transition temperature of propionated Hylon VII as prepared in Example 1, Tg onset values being from DSC of solution-cast films prepared by casting from acetone solution;

FIG. 8 is a graph showing DSC thermal analysis of starch esters with varying degrees of substitution, all samples being pre-annealed for 20 minutes at 150° C., cooled slowly at room temperature and scanned at 10 deg/min; and, FIG. 9 is a graph showing comparison of relative water absorption of unmodified starch with modified starch compositions, tensile bar samples being equilibrated at 50% RH for 5 days and stored at 93% RH.

DETAILED DESCRIPTION OF THE INVENTION

Figure 1A:
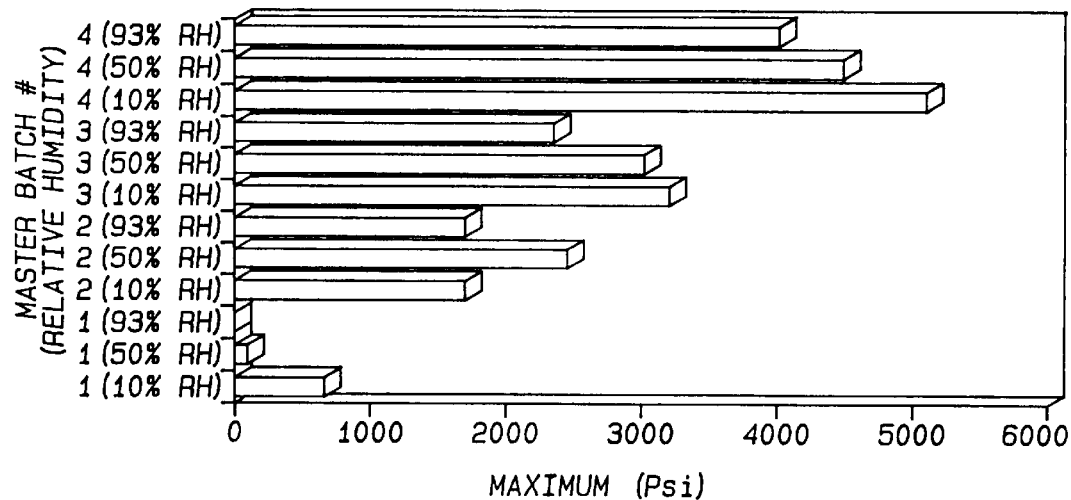
FIG. 1 shows bar graphs of tensile properties for an unmodified starch sample and for modified samples in terms of maximum Psi, Young's modulus (MPsi) and elongation at break (%), tensile test bars were equilibrated at 10, 50 and 93% RH for 48 hours.

The present invention provides a method of preparing a biodegradable modified starch product generally by the steps of preparing a modified starch and forming a hydrophobic modified starch product therefrom. More specifically, the process includes the steps of combining a starch with an anhydride, organic acid, acid chloride, ketene, or other esterification reagents in an anhydrous aprotic solvent, optionally in the presence of a basic catalyst thereby causing a reaction between the starch and anhydride, organic acid, acid chloride, ketene or other esterification reagents, optionally neutralizing the reaction during the combining step and then forming a hydrophobic biodegradable starch ester product. For example, by slowly adding anhydride to the solvent containing the starch while continuously neutralizing the reaction during the addition step, acid-catalyzed hydrolysis and the corresponding reduction in molecular weight of the modified starch products are minimized. Thus, hydrophobic products are obtained which are water repellent, in contrast to the starch raw material, which is hydrophilic and water soluble. Such starch ester compositions have higher molecular weight than compositions prepared by the same method in the absence of a neutralizing agent. The capability to produce high molecular weight starch ester compositions is essential for obtaining compositions having good mechanical properties.

Starch $(C_6H_{10}O_5)_n$ is a mixture of linear (amylose) and branched (amylopectin) polymers. Amylose is essentially a linear polymer of $\alpha(1\rightarrow4)$ linked D-glucopyranosyl units. Amylopectin is a highly-branched polymer of D-glucopyranosyl units containing $\alpha(1\rightarrow4)$ linkages, with $\alpha(1\rightarrow6)$ linkages at the branch points. The present invention can be used with various types of starches, such as regular corn starch which contains about 75% amylopectin (higher molecular weight branched starch polymer) and 25% amylose (lower molecular weight linear starch polymer), as well as hybrid corn starch products containing more than 50% amylose, sold by National Starch and Chemical Company and American Maize Products Company. Various other starches, such as potato starch, tapioca starch, rice starch, wheat starch, cassava starch, and other starches familiar to those skilled in the art can be utilized in accordance with the present invention. Compositions having increased levels of linear starch polymers are most likely to be the correct choice in terms of processability, film forming, molding, and mechanical properties.

The starch ester compositions of the present invention comprise what is considered in the art to be a specialty starch, preferably having an amylose content greater than 50% and most preferably greater than 70%. The degree of substitution preferably ranges from 0.4 to 2.5 DS and more preferably from 1.0 to 2.0 DS. The most preferred composition ranges from 1.2 to 1.7 DS.

A wide range of starch esters can be prepared using a wide variety of anhydrides, organic acids, acid chlorides, ketene, or other esterification reagents. The starch esters range from acetate, butyrate, up to C18 esters, and combinations of esters to derive copolymers. Examples of anhydrides include acetic-, propionic-, butyric-, maleic-, succinic-, phthalic- and stearic anhydride. Combinations of anhydrides can be used to derive copolymer derivatives. Anhydrous aprotic solvents, such as dimethylsulfoxide (DMSO), N-methyl pyrrolidone (NMP), dimethyl formamide (DMF), dimethyl acetamide (DMAc), etc., are well known in the chemical arts. DMSO is the preferred solvent capable of forming a solution of the starch and the anhydride(s), as well as the base catalyst and other additives. In addition, most starch ester products resulting from the modification process described in the present invention are soluble in DMSO. The solvent is also water-miscible which facilitates product work-up by precipitation in water. The solution of starch is formed by dispersing anhydrous starch (water level preferably <50,000 ppm, more preferably <5,000 ppm, most preferably <2,000 ppm) in anhydrous DMSO (water level preferably <1,000 ppm, more preferably <500 ppm, most preferably <100 ppm) at room temperature (20° to 25° C.) and heating the mixture under mechanical agitation to above 80° C. for approximately 10 minutes. The reaction of the starch and anhydride can be performed in the presence of a small amount of base catalyst. Examples of such catalysts are 4-dimethylaminopyridine (DMAP), triethylamine, ammonia, sodium hydroxide, potassium hydroxide, and other bases well known to those skilled in the chemical arts. The preferred catalyst is DMAP which is a highly efficient acylation catalyst available as a powder which is soluble in DMSO. The preferred range of DMAP is 0.01 to 15 mole % (based on anhydride), the more preferred range being 0.1 to 10 mole %, and the most preferred range being 0.5 to 4 mole %. The most preferred catalyst is a cross-linked polyvinylpyridine available in the form of gel beads (e.g., POLY-DMAP from Reilly Industries, Inc.) which are insoluble in all solvents, facilitate easy separation from the product by filtration, and can be readily recycled for multiple uses. The latter is also preferred from a safety and environmental standpoint, as opposed to pyridine, for example, which is highly toxic, odorous and for which larger than catalytic quantities would be required for starch modifications similar to those in the present invention.

In a typical starch modification reaction a solution of starch is prepared in an aprotic solvent such as DMSO at a preferred level of up to 50% weight of starch by volume of DMSO. A more preferred level of 1 to 25% weight of starch by volume of DMSO is used, and a most preferred level of 5 to 15%, by dispersing the anhydrous starch powder (water level preferably <50,000 ppm, more preferably <5,000 ppm, most preferably <2,000 ppm) in a mechanically stirred vessel containing DMSO (water level preferably <1,000 ppm, more preferably <500 ppm, most preferably <100 ppm) which is maintained at about 20° to 25° C., optionally under inert atmosphere. Subsequently, the dispersion is dissolved by heating the mixture under mechanical agitation to above 80° C., preferably from 80° to 90° C., for approximately 5 to 15 minutes. Prior to the modification reaction the mixture is preferably cooled back to room temperature (20° to 25° C.). Optionally, about 10 to 200 mole % (based on anhydride) of a neutralizing agent such as sodium bicarbonate is added; more preferably 50 to 150 mole %, and most preferably an equimolar level (100 mole %) is added. Subsequently, a solution containing up to 15 mole % DMAP (based on anhydride) in DMSO, or more preferably containing from 0.1 to 10 mole % DMAP, and most preferably containing 0.5 to 4 mole % DMAP, is added to the starch-DMSO solution, or optionally added slowly during the starch modification reaction. Starch modification is achieved by the addition of anhydride, or other esterification reagents, preferably over the course of ½ to 2 hours while maintaining the reaction temperature below 30° C. The continuous addition of anhydride, as opposed to batch addition at the start of the reaction, has the advantage of controlling the reaction exotherm and minimizing the average ratio of anhydride-generated acid to neutralizing agent during the reaction. As a result, these reaction conditions minimize molecular weight reduction of the starch and modified starch in the mixture. The product can be recovered by precipitation in an approximately 3 to 10-fold excess of water, or other non-solvents as for example ethanol, isopropanol, butanol, etc., under vigorous mechanical agitation, and filtered off, followed by multiple washes with non-solvent. Neutralization of the reaction is continuously carried out by adding to the reaction mixture a neutralizing agent, such as sodium bicarbonate and then slowly adding the anhydride over the course of the reaction. Other examples of neutralizing agents are potassium bicarbonate, ammonium bicarbonate, sodium carbonate, potassium carbonate, ammonium carbonate, sodium hydrogen phthalate, sodium hydroxide, potassium hydroxide, ammonium hydroxide, sodium bisulfate, potassium bisulfate, ammonium bisulfate, ammonium dihydrogen phosphate, and other neutralizing agents familiar to those skilled in the art.

The desired results are achieved because the acid by-product is neutralized throughout the reaction period in an excess of the neutralizing agent.

The present invention provides modified starch products having good processability, water resistance and mechanical properties by controlling the degree of substitution, in addition to molecular weight control. As discussed in the Background Section, this is in contrast with prior art high DS starch esters which either yielded degraded products[25,26] having significantly reduced molecular weights, or utilized processes which are commercially unattractive.[15,16,25-30] In the present invention high yields (up to 96%) are obtained by using equimolar levels of anhydride relative to starch hydroxyl moieties. The present method employs a homogenous process which results in the destruction of the granular structure of starch to give starch esters having a more uniform and narrow substitution profile than the prior art.

Current starch-based biodegradable products are water sensitive. The present invention provides modified starch compositions that are thermoplastic and hydrophobic. Moreover, the compositions of the present invention are water insoluble as demonstrated by the fact that the reaction product is recovered by precipitation in water. Thus, these modified starches are water insoluble as a result of the chemical modification process.

A plasticizer can be added to the composition to achieve greater material processability and product flexibility. Accordingly, molded articles and films prepared from the starch esters described in this invention can be enhanced by mixing with a variety of low molecular-weight ester plasticizers of the solvent type. A strict requirement for these plasticizers is that they are fully biodegradable. Examples of such plasticizers include a variety of esters, such as phthalate esters (dimethyl-, diethyl-, dipropyl-, dibutyl-, dihexyl-, diheptyl-, dioctyl-, etc.), dimethyl- and diethylsuccinate and related esters, glycerol triacetate (triacetin), glycerol mono- and diacetate, glycerol mono-, di- and tripropionate, glycerol tributanoate (tributyrin), glycerol mono- and dibutanoate, glycerol mono-, di- and tristearate, and other related glycerol esters, lactic acid esters, citric acid esters, adipic acid esters, stearic acid esters, oleic acid esters, ricinoleic acid esters, other fatty acid esters, erucic acid esters, soybean oil, caster oil, and various other biodegradable esters known in the chemical arts. Preferably, triacetin is used as a suitable plasticizer since it induces high flexibility, has a high boiling point (258° C.), is biodegradable, and is commercially available at a reasonable cost as reported in Chemical Marketing Reporter, Mar. 23, 1992. A linear plot is produced of 1/Tg vs. blend composition which is evidence of the effective plasticization capability, as per the Fox/Flory theory (See FIGS. 6 and 7, and the discussion in Example 22). As set forth below in the Experimental Section, molded articles and transparent as well as translucent films can be prepared. Inorganic and organic fillers can be added to extend the range of properties of molded articles. Such inorganic fillers include talc (hydrous magnesium silicate), titanium dioxide, calcium carbonate, clay, sand, chalk, limestone, diatomaceous earth, silicates, boron nitride, mica, glass, quartz, and ceramics, and biodegradable organic fillers such as starch, cellulose, wood flour and fibers, pecan fibers, and other inorganic and organic filler materials well known in the chemical arts. Compounding with compatible additives, preferably talc and similar inorganic structural fillers, provides added compositions of matter with unusually increased strength and modulus. Examples of materials made in accordance with the present invention in compost experiments confirm biodegradability.

EXPERIMENTAL SECTION

EXAMPLE 1

A starch modification reaction was carried out using as follows: 1502 g dried Hylon VII high-amylose corn starch, obtained from National Starch and Chemical Corporation, (=9.25 moles of anhydroglucose repeat units; water content ~2000 ppm) was dispersed in 10 L of anhydrous DMSO (water content ~250 ppm) under rapid mechanical agitation at about 20° to 25° C., in a 10 gallon jacketed vessel. The dispersion was dissolved by heating the mixture under mechanical agitation in a nitrogen atmosphere to 80°±5° C., for approximately 10 minutes. Subsequently the mixture was cooled to room temperature (~25° C.); 90 g of DMAP powder was dissolved at room temperature in 2.5 L of anhydrous DMSO and added to the vessel. Next, 1558 g sodium bicarbonate powder (approx. equimolar level based on anhydride) was added to the stirred vessel. Starch modification was achieved by the addition of 2284 g (2075 mL) propionic anhydride (=17.6 moles; DS-theor.=1.9), over the course of 1 hour while maintaining the reaction temperature below 30° C. by circulating cooling water through the jacket of the 10 gallon vessel. The continuous slow addition of anhydride over the given time period, as opposed to batch addition at the start of the reaction, has the advantage of controlling the reaction exotherm, and minimizing the average ratio of anhydride-generated acid to neutralizing agent during the reaction. As a result, these reaction conditions minimize molecular weight reduction of the starch or modified starch in the mixture. The product was recovered by precipitation in approximately 20 gal. (~75 L) of water under vigorous mechanical agitation, and filtered off over a pressure filter. A pH=7.3 was recorded for the precipitate which was washed 5 times with about 20 gal. of water (pH of water~9.4) to give a final pH=8.6 for the fifth wash. The product was dried by placing a ½ inch thick layer of the product crumbs on multiple stainless steel trays in a grounded convectional air-driven oven at 55° C. for 48 hours. A yield of 90% was obtained. The degree of substitution (DS) was determined to be DS=1.72 by titration in triplicate of hydrolyzed samples according to a published method (a set of three triplicates gave average DS values of 1.77, 1.69 and 1.69).[35] A DS=1.4 was calculated based on the conversion of anhydride.

EXAMPLE 2

The procedure given in example 1 was followed using 2250 g dried Hylon VII high-amylose corn starch in 15 L anhydrous DMSO, to which was added 2108 g sodium bicarbonate, and 122 g DMAP dissolved in 1.75 L of anhydrous DMSO. 3434 g (3119 mL) of Propionic anhydride (DS-theor.=1.9) was added to the vessel over the course of 1 hour. Subsequently, a solution of 68.1 g of maleic anhydride (DS-theor.=0.05) in 2 L anhydrous DMSO was added to the vessel over the course of 15 minutes. A pH=7.5 was recorded for the precipitate which was washed 5 times with about 20 gal. of water (pH of water~9.4) to give a final pH=9.4 for the fifth wash. The yield of the starch ester product was 88%. A DS=1.4 was calculated based on the conversion of anhydride.

EXAMPLE 3

The procedure given in example 1 was followed using 1502 g dried Hylon VII high-amylose corn starch in 10 L anhydrous DMSO; 81 g DMAP dissolved in 1 L of anhydrous DMSO. This starch modification reaction was carried out in the absence of the sodium bicarbonate neutralizing agent. 2289 g (2079 mL) of Propionic anhydride (DS-theor.=1.9) was added to the vessel over the course of 1 hour. Subsequently, a solution of 45.4 g of maleic anhydride (DS-theor.=0.05) in 1 L anhydrous DMSO was added to the vessel over the course of 15 minutes. A pH=4.3 was recorded for the precipitate which was washed 5 times with about 20 gal. of water (pH of water~9.4) to give a final pH=8.3 for the eighth wash. The yield of the starch ester product was 90%. A DS=1.5 was calculated based on the conversion of anhydride.

EXAMPLE 4

The procedure given in example 1 was followed using 603 g dried regular corn starch in 4 L anhydrous DMSO, to which was added 620 g sodium bicarbonate, and 36 g DMAP dissolved in 1 L of anhydrous DMSO. 962 g of Propionic anhydride (DS-theor.=2.0) was added to the vessel over the course of 1 hour. A pH=7.1 was recorded for the precipitate which was washed 5 times with about 20 gal. of water (pH of water~9.4) to give a final pH=9.2 for the fifth wash. The yield of the starch ester product was 86%. A DS=1.4 was calculated based on the conversion of anhydride. Analysis of the sample by 300 MHz $^1$H NMR spectroscopy in DMSO-d6 gave a DS=1.80.

EXAMPLE 5

A starch modification reaction was carried out using as follows: 35 g of dried regular corn starch (=0.22 moles of anhydroglucose repeat units; water content ~2000 ppm) was dispersed in 300 mL of anhydrous DMSO (water content ~250 ppm) under-rapid mechanical agitation at about 20° to 25° C., in a 500 mL four-necked flask. The dispersion was dissolved by heating the mixture under mechanical agitation in a nitrogen atmosphere to 80°±5° C., for approximately 10 minutes. Subsequently the mixture was cooled to room temperature (~25° C.); 2.1 g of DMAP powder was dissolved at room temperature in 50 mL of anhydrous DMSO and added to the flask. Next, 36.5 g sodium bicarbonate powder (approx. half-molar level based on anhydride) was added to the stirred vessel. Starch modification was achieved by the addition of 88.5 g acetic anhydride (=0.87 moles; DS-theor.=3.0), over the course of 1 hour while maintaining the reaction temperature below 40° C. by cooling with an ice/water bath. The product was recovered by precipitation in a ten-fold excess of water under vigorous mechanical agitation; the water/precipitate mixture was ground in a blender to improve the work-up. A pH=5.0 was recorded for the precipitate which was washed 7 times with about 1 L of water (pH of water~9.4) to give a final pH=7.2 for the seventh wash. The product was filtered over a Buchner funnel and dried by placing the crumbs on a teflon tray in a vacuum oven at 55° C. through which a steady flow of dry nitrogen was passed for 24 hours. A yield of 94% was obtained. A DS=2.6 was calculated based on the conversion of anhydride.

EXAMPLE 6

The procedure given in example 5 was followed using 10 g dried potato amylose starch in 250 mL anhydrous DMSO, to which was added 10.6 g sodium bicarbonate (approx. equimolar level based on anhydride), and 0.64 g DMAP dissolved in 50 mL of anhydrous DMSO. 13.1 g of Acetic anhydride (DS-theor.=2.0) was added to the vessel over the course of 1 hour. A pH=5.1 was recorded for the precipitate which was washed 4 times with about 1 L of water (pH of water~9.4) to give a final pH=8.7 for the fourth wash. The yield of the starch ester product was 89%. A DS=1.4 was calculated based on the conversion of anhydride. Analysis of the sample by 300 MHz $^1$H NMR spectroscopy in DMSO-d6 gave a DS=1.63.

EXAMPLE 7

The procedure given in example 5 was followed using 31 g dried potato amylose starch in 300 mL anhydrous DMSO, to which was added 31 g sodium bicarbonate (approx. equimolar level based on anhydride), and 1.87 g DMAP dissolved in 50 mL of anhydrous DMSO. 48.8 g of Propionic anhydride (DS-theor.=2.0) was added to the vessel over the course of 1 hour. A pH=6.4 was recorded for the precipitate which was washed 4 times with about 1 L of water (pH of water~9.4) to give a final pH=9.0 for the fourth wash. The yield of the starch ester product was 87%. A DS=1.3 was calculated based on the conversion of anhydride. Analysis of the sample by 300 MHz $^1$H NMR spectroscopy in DMSO-d6 gave a DS=1.49.

EXAMPLE 8

The procedure given in example 5 was followed using 30 g dried potato amylose starch in 300 mL anhydrous DMSO, and 1.82 g DMAP dissolved in 50 mL of anhydrous DMSO. This starch modification reaction was carried out in the absence of the sodium bicarbonate neutralizing agent. 48.7 g of Propionic anhydride (DS-theor.=2.0) was added to the vessel over the course of 1 hour. A pH=4.7 was recorded for the precipitate which was washed 9 times with about 1 L of water (pH of water~9.4) to give a final pH=6.8 for the ninth wash. The yield of the starch ester product was 83%. A DS=1.2 was calculated based on the conversion of anhydride.

EXAMPLE 9

The procedure given in example 5 was followed using 10 g dried potato amylose starch in 250 mL anhydrous DMSO, to which was added 13.4 g sodium bicarbonate (approx. equimolar level based on anhydride), and 0.79 g DMAP dissolved in 50 mL of anhydrous DMSO. 20.0 g of Propionic anhydride (DS-theor.=2.5) was added to the vessel over the course of 1 hour. A pH=6.8 was recorded for the precipitate which was washed 4 times with about 1 L of water (pH of water~9.4) to give a final pH=9.4 for the fourth wash. The yield of the starch ester product was 87%. A DS=1.8 was calculated based on the conversion of anhydride.

EXAMPLE 10

The procedure given in example 5 was followed using 10 g dried potato amylose starch in 250 mL anhydrous DMSO, and 0.80 g DMAP dissolved in 50 mL of anhydrous DMSO. This starch modification reaction was carried out in the absence of the sodium bicarbonate neutralizing agent. 19.9 g of Propionic anhydride (DS-theor.=2.5) was added to the vessel over the course of 1 hour. A pH=4.3 was recorded for the precipitate which was washed 6 times with about 1 L of water (pH of water~9.4) to give a final pH=9.2 for the sixth wash. The yield of the starch ester product was 85%. A DS=1.7 was calculated based on the conversion of anhydride.

EXAMPLE 11

A starch modification reaction was carried out using as follows: 47.65 g of stearic anhydride (=0.087 moles; DS-theor.=1.0) and 14.4 g of dried Hylon VII high-amylose corn starch (=0.089 moles of anhydroglucose repeat units; water content ~2000 ppm) was dispersed in 300 mL of anhydrous DMSO (water content ~250 ppm) under rapid mechanical agitation at about 20° to 25° C., in a 500 mL four-necked flask. The dispersion was dissolved by heating the mixture under mechanical agitation in a nitrogen atmosphere to 110°±5° C., for approximately 10 minutes. Subsequently the mixture was cooled to 80° C.; 1.1 g of DMAP powder was dissolved at room temperature in 25 mL of anhydrous DMSO and added dropwise to the flask. After 7 minutes the flask was cooled to room temperature with an ice/water bath. The product was recovered by precipitation in a ten-fold excess of water under vigorous mechanical agitation; the water/precipitate mixture was ground in a blender to improve the work-up. The product was filtered over a Buchner funnel and dried by placing the crumbs on a teflon tray in a vacuum oven at 55° C. though which a steady flow of dry nitrogen was passed for 24 hours. A yield of 86% was obtained, taking into account that 83% of stearic acid was recovered under similar conditions in the absence of starch.

EXAMPLE 12

The procedure given in example 11 was followed using 49.5 g of acetic anhydride (=0.49 moles; DS-theor.=1.7) and 30.2 g of stearic anhydride (=0.055 moles; DS-theor.=0.2) and 45.7 g of dried Hylon VII high-amylose corn starch (=0.28 moles of anhydroglucose repeat units; water content ~2000 ppm). The dispersion was dissolved by heating the mixture under mechanical agitation in a nitrogen atmosphere to 85°±5° C. for approximately 10 minutes; 2.72 g of DMAP powder was dissolved at room temperature in 25 mL of anhydrous DMSO and added dropwise to the flask. After 7 minutes the flask was cooled to room temperature with an ice/water bath. The product mixture was dark black and could not be recovered by precipitation in water in which it was soluble.

EXAMPLE 13

The procedure given in example 11 was followed using 18.9 g of stearic anhydride (=0.034 moles; DS-theor.=0.2) and 25.1 g of dried Hylon VII high-amylose corn starch (=0.15 moles of anhydroglucose repeat units; water content ~2000 ppm). The dispersion was dissolved by heating the mixture under mechanical agitation in a nitrogen atmosphere to 85°±5° C. for approximately 10 minutes; 1.71 g of DMAP powder was dissolved at room temperature in 50 mL of anhydrous DMSO and added dropwise to the flask. After 30 minutes the flask was slowly cooled to room temperature. Subsequently, 27.8 g of Acetic anhydride (=0.27 moles; DS-theor.=1.7) was added over the course of 1 hour while maintaining the reaction temperature below 35° C. by cooling with an ice/water bath. The product was recovered by precipitation in a ten-fold excess of water under vigorous mechanical agitation; the water/precipitate mixture was ground in a blender to improve the work-up. A pH=3.6 was recorded for the precipitate which was washed 7 times with about 1 L of water (pH of water~9.4) to give a final pH=7.0 for the seventh wash. The product was filtered over a Buchner funnel and dried by placing the crumbs on a teflon tray in a vacuum oven at 55° C. though which a steady flow of dry nitrogen was passed for 24 hours. A yield of 89% was obtained, taking into account that 83% of stearic acid was recovered under similar conditions in the absence of starch.

EXAMPLE 14

A starch modification reaction was carried out using as follows: 30.6 g of dried Hylon VII high-amylose corn starch (=0.19 moles of anhydroglucose repeat units; water content ~2000 ppm) was dispersed in 300 mL of anhydrous DMSO (water content ~250 ppm) under rapid mechanical agitation at about 20° to 25° C., in a 500 mL four-necked flask. The dispersion was dissolved by heating the mixture under mechanical agitation in a nitrogen atmosphere to 80°±5° C., for approximately 10 minutes. Subsequently the mixture was cooled to room temperature (~25° C.); 1.8 g of DMAP powder was dissolved at room temperature in 50 mL of anhydrous DMSO and added to the flask. Next, 31.9 g sodium bicarbonate powder (approx. 1.1 to 1 molar ratio to anhydride) was added to the stirred vessel. Starch modification was achieved by the slow addition of 34.6 g acetic anhydride (=0.34 moles; DS-theor.=1.8), over the course of 1 hour while maintaining the reaction temperature below 40° C. by cooling with an ice/water bath. The product was recovered by precipitation in a ten-fold excess of water under vigorous mechanical agitation; the water/precipitate mixture was ground in a blender to improve the work-up. A pH=5.7 was recorded for the precipitate which was washed seven times with about 1 L of water (pH of water~9.4) to give a final pH=7.1 for the fifth wash. The product was filtered over a Buchner funnel and dried by placing the crumbs on a teflon tray in a vacuum oven at 55° C. though which a steady flow of dry nitrogen was passed for 24 hours. A yield of 90% was obtained. A DS=1.2 was calculated based on the conversion of anhydride.

EXAMPLE 15

The procedure given in example 14 was followed using 30.3 g of dried Hylon VII high-amylose corn starch (=0.19 moles of anhydroglucose repeat units; water content ~2000 ppm) in 250 mL anhydrous DMSO, to which was added 26.4 g sodium bicarbonate (approx. equimolar level based on anhydride), and 1.55 g DNAP dissolved in 50 mL of anhydrous DMSO. 41.9 g of Propionic anhydride (DS-theor.=1.7) was added to the vessel over the course of 1 hour. A pH=5.0 was recorded for the precipitate which was washed 4 times with about 1 L of water (pH of water~9.4) to give a final pH=9.0 for the fourth wash. The yield of the starch ester product was 92%. The degree of substitution was determined to be DS=1.52 by titration in triplicate of hydrolyzed samples according a published method.[35] A DS=1.4 was calculated based on the conversion of anhydride.

EXAMPLE 16

The procedure given in example 14 was followed using 29.9 g of dried Hylon VII high-amylose corn starch (=0.18 moles of anhydroglucose repeat units; water content ~2000 ppm) in 200 mL anhydrous DMSO, to which was added 31.2 g sodium bicarbonate (approx. equimolar level based on anhydride), and 1.79 g DMAP dissolved in 50 mL of anhydrous DMSO. 58.4 g of Butyric anhydride (DS-theor.=2.0) was added to the vessel over the course of 1 hour. A pH=5.0 was recorded for the precipitate which was washed 6 times with about 1 L of water (pH of water~9.4) to give a final pH~9 for the sixth wash. The yield of the starch ester product was 94%. A DS=1.8 was calculated based on the conversion of anhydride.

EXAMPLE 17

The procedure given in example 14 was followed using 30.0 g of dried Hylon VII high-amylose corn starch (=0.19 moles of anhydroglucose repeat units; water content ~2000 ppm) in 200 mL anhydrous DMSO, to which was added 31.3 g sodium bicarbonate (approx. equimolar level based on anhydride), and 1.78 g DMAP dissolved in 50 mL of anhydrous DMSO. 24.0 g of Propionic anhydride (DS-theor.=1.0) and 29.9 g of butyric anhydride (DS-theor.=1.0) was added to the vessel over the course of 1 hour. A pH=5.5 was recorded for the precipitate which was washed 5 times with about 1 L of water (pH of water~9.4) to give a final pH=8.5 for the fifth wash. The yield of the starch ester product was 92%. A DS=1.6 was calculated based on the conversion, assuming equal reactivity for the two anhydrides.

EXAMPLE 18

The procedure given in example 14 was followed using 29.2 g of dried Hylon VII high-amylose corn starch (=0.18 moles of anhydroglucose repeat units; water content ~2000 ppm) in 250 mL anhydrous DMSO, to which was added 61.6 g sodium bicarbonate (approx. equimolar level based on anhydride), and 3.65 g DMAP dissolved in 75 mL of anhydrous DMSO. 96.5 g of Propionic anhydride (DS-theor.=3.0) was added to the vessel over the course of 1 hour. A pH~5 was recorded for the precipitate which was washed 5 times with about 1 L of water (pH of water~9.4) to give a final pH=8 for the fifth wash. The yield of the starch ester product was 88% based. A DS=2.3 was calculated based on the conversion of anhydride.

EXAMPLE 19

The procedure given in example 14 was followed using 50 g of dried Hylon VII high-amylose corn starch (=0.31 moles of anhydroglucose repeat units; water content ~2000 ppm) in 350 mL anhydrous DMSO, to which was added 46.9 g sodium bicarbonate (approx. 1.8 to 1 ratio to anhydride), and 2.7 g DMAP dissolved in 50 mL of anhydrous DMSO. 40.1 g of Propionic anhydride (DS-theor.=1.0) was added to the vessel over the course of 1 hour. A pH=7.8 was recorded for the first precipitate which was very sticky and loss of some product occurred during filtration. The degree of substitution was determined to be DS=1.01 by titration in triplicate of hydrolyzed samples according to a published method.[35]

EXAMPLE 20

A starch modification reaction was carried out using as follows: 700.9 g of dried Hylon VII high-amylose corn starch (=4.33 moles of anhydroglucose repeat units; water content ~2000 ppm) was dispersed in 5 L of anhydrous DMSO (water content ~76 ppm) under rapid mechanical agitation at about 20° to 25° C., in a 12 L four-necked flask. The dispersion was dissolved by heating the mixture under mechanical agitation in a nitrogen atmosphere to 80°±5° C., for approximately 30 minutes. Subsequently the mixture was cooled to room temperature (~25° C.), and 1285 g of propionic anhydride (=9.88 moles; DS-theor.=2.3) was added over the course of 25 minutes to avoid precipitation of starch. Starch modification was achieved by the slow addition of 48.4 g of DMAP (dissolved in 770 mL of anhydrous DMSO) over the course of 45 minutes while maintaining the reaction temperature below 30° C. by cooling with an ice/water bath. The product was recovered by precipitation in approximately 10 gal. of water under vigorous mechanical agitation, and filtered off over a pressure filter. The product was washed 7 times with about 2 gal. of water and dried by placing a ½ inch thick layer of the product crumbs on multiple stainless steel trays in a grounded convectional air-driven oven at 55° C. for 48 hours. A yield of 96% was obtained. A DS=2.0 was calculated based on the conversion of anhydride.

EXAMPLE 21

To illustrate the thermoplastic behavior of the starch esters prepared by this invention, 9 compositions are listed in Table 1 (master batch 2 to 10) which were processed in conventional plastics-type processing equipment which was used without any special modifications. These master batches were prepared for twin-screw extrusion and injection molding of tensile test bars and determination of mechanical properties such as tensile strength, initial modulus and elongation to break. In addition, a composition containing unmodified starch (master batch 1) was prepared using glycerol plasticizer. Comparison of this unmodified starch composition with the modified starch compositions given in Table 1, serves to illustrate the property enhancement made by the modification process described in this invention, such as improved moisture resistance and enhanced mechanical properties. The master batches given in Table 1 were prepared by using a Containerized Batch Mixer equipped with a tumbling 8 quart stainless steel mixing chamber, internal mixing agitators and liquid injection auxiliary for homogeneous dispersion of plasticizers. This solids mixer provided homogeneous mixtures of the modified starch powders with plasticizer and other additives such as fillers. A twin-screw extruder with 1" diameter screws (L/D=14) and dual orifice die, along with a pelletizer, was used to process the powders from master batches 1 to 10 at a temperature profile of 105° C. (zone 1: feed), 165° C. (zone 2), 165° C. (zone 3), and 155° C. (zone 4: Die), to give pelletized (or granulated) resins reminiscent of conventional commercial plastic pellets. Injection molded tensile test bars were prepared and tested according to ASTM standard procedure #D638-91 (using Type 1 tensile bar specimen). Three sets of about 10 tensile test bars were equilibrated for 48 hours at 10, 50 and 93±5% relative humidity conditions, and their mechanical properties are given in Table 2.

Figure 1B:
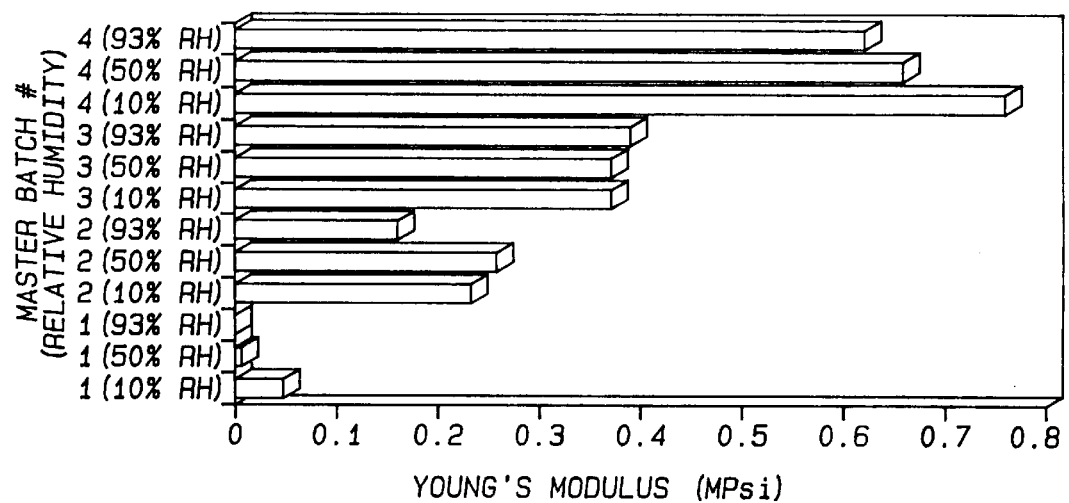
Figure 1C:
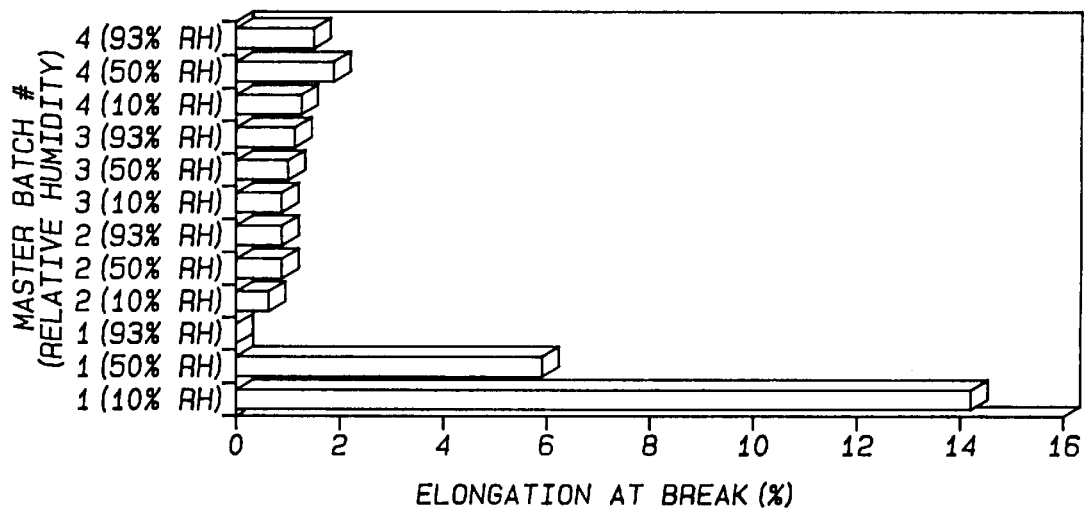
Figure 2A:
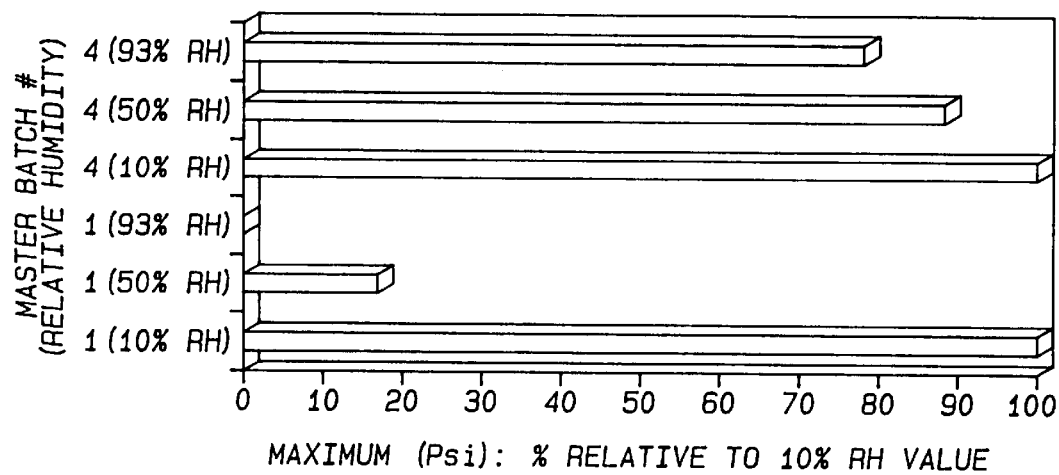
FIG. 2 illustrates bar graphs showing variation in maximum Psi and Young's modulus for an unmodified starch sample and for a modified starch sample wherein tensile test bars were equilibrated at 10, 50, and 93% RH for 48 hours.
Figure 2B:
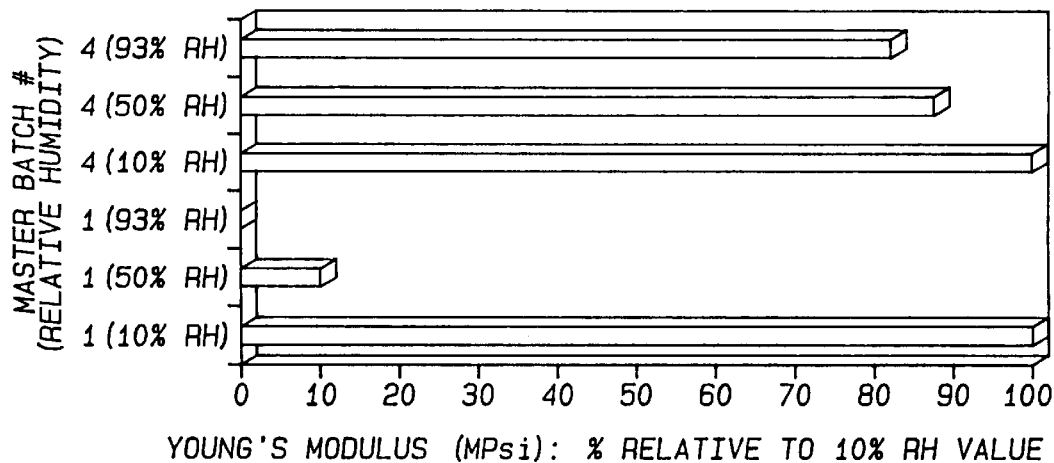

FIG. 1 illustrates the significant increase in mechanical strength (Maximum Psi) and stiffness (Young's Modulus) achieved by the starch modification process described in this invention, as well as a significant decrease in property variation with changes in relative humidity (RH) by comparing the unmodified starch composition (master batch 1) with modified starch compositions (master batch 2, 3 and 4). The mechanical properties that can be attained for the modified starch compositions described in this invention are in the range of polystyrene (i.e. sample 4, for example). This exemplifies the feasibility of using these biodegradable bio-based plastics for various single-use applications such as a replacement for polystyrene type disposable cutlery and various packaging materials. Tensile bars prepared from the unmodified starch composition (master batch 1) equilibrated for 48 hours at 93% RH were severely cracked, swollen and deformed, and had virtually lost all strength and integrity; these samples could be pulled apart manually and had a dough-like consistency. In contrast, tensile bars prepared from the starch ester compositions (master batch 2 to 10) did not change in appearance with change in relative humidity. Moreover, the minor changes observed in mechanical properties (see FIGS. 1 and 2) with changes in relative humidity further serve to illustrate the significantly enhanced moisture resistance for the starch ester compositions described in this invention.

FIG. 1 further illustrates a significant enhancement in mechanical strength (Maximum Psi) and stiffness (Young's Modulus) achieved by the addition of a filler. The increase in modulus resulting from the addition of a filler to a polymeric resin is well known to those skilled in the art. However, the corresponding increase in mechanical strength observed here for the modified starch compositions with addition of talc, or other fillers, is a unique embodiment of this invention. Without being restrictive, these results indicate good wetting of the modified starch polymer with the filler surface.

Figure 3A:
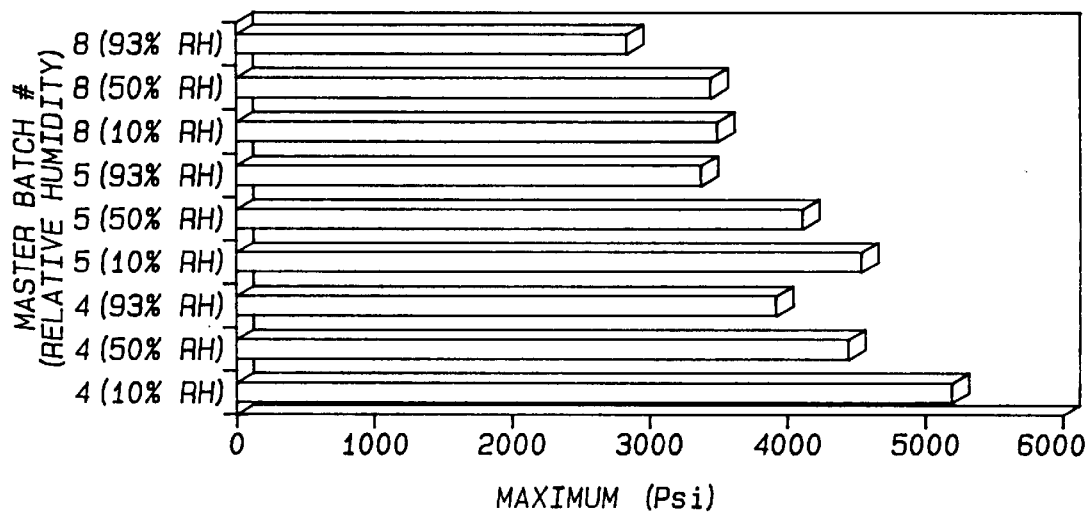
FIG. 3 illustrates bar graphs showing tensile properties for modified starch samples for maximum Psi, Young's modulus (MPsi) and elongation at break (%) wherein the tensile text bars were equilibrated at 10, 50 and 93% RH for 48 hours.
Figure 3B:
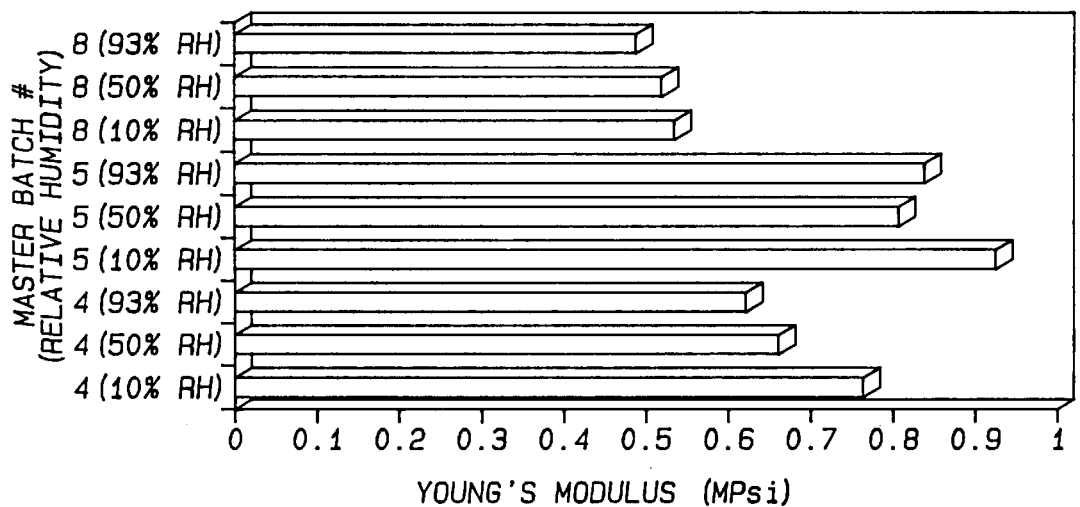
Figure 3C:
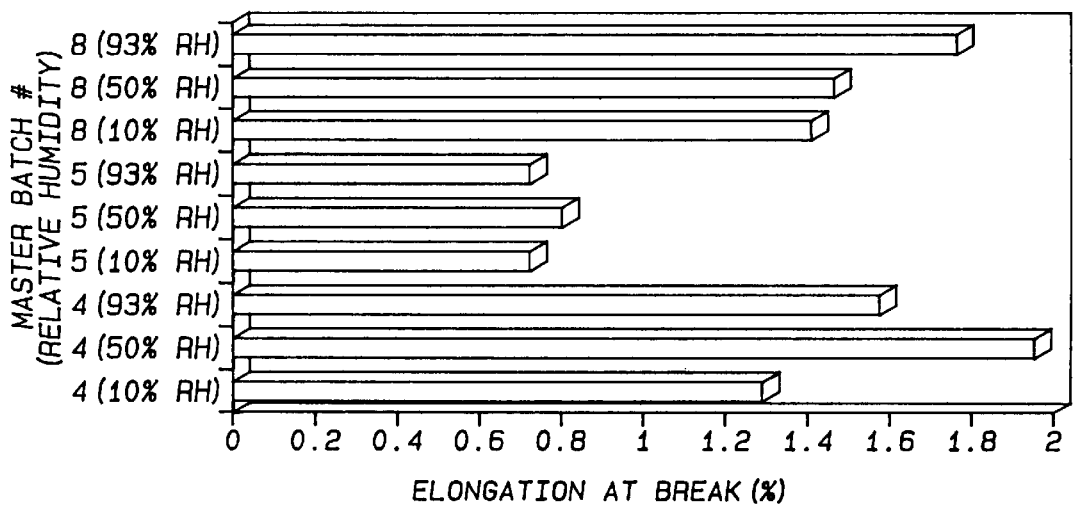

FIG. 3 illustrates the effect of neutralizing agent on the mechanical properties. Higher mechanical strength was obtained for a starch ester composition prepared in the presence of sodium bicarbonate, as a result of the neutralization of propionic acid by-product formed during the modification process. The increase in modulus and decrease in elongation to break, paired with the decrease in mechanical strength observed here for tensile samples prepared from master batch 5 as compared to those prepared from master batch 4 (FIG. 3), indicates a more brittle material results for modified starches when prepared in the absence of a neutralizing agent such as sodium bicarbonate, or other neutralization agents, which is a unique embodiment of this invention. Clearly the magnitude of change in mechanical properties depends on the concentration of starch and anhydride(s) used in the modification process, the level and effectiveness of the neutralizing agent employed, as well as on the level of the various additives in the master batch.

Without being restrictive, the enhancement of mechanical properties is probably the result of a neutralizing agent employed in the starch modification process in which starch remains virtually undegraded to yield a high molecular weight modified starch product, thus yielding molded products having relatively higher ultimate tensile strength. Gel permeation chromatography (GPC) indicated that the nominal weight average molecular weight, Mw, determined in DMSO solvent (containing 0.01M LiBr to prevent aggregation) remained virtually unchanged for starch when modified in the presence of sodium bicarbonate ($NaHCO_3$), while it decreased in the absence of the neutralizing agent. To allow for a valid comparison, only modified samples of highly purified amylose were used because the interpretation of molecular weights determined by GPC for mixtures of linear and branched polymers is highly complex. In addition, starch was regenerated in a manner similar to a procedure published previously;[35,36] however, the procedure was modified to afford GPC samples in DMSO solvent. Thus, regenerated starches were prepared for potato amylose esters using saponification, by placing 0.500 g of starch ester and 50 mL of 1M KOH in water in a 100 mL volumetric flask, allowing it to hydrolyze for 3 days in a refrigerator at 4° C. with periodic agitation, and subsequently allowing it to warm to room temperature, filling the volumetric to the mark with 1M KOH followed by neutralization of 10.00 mL of this solution with 5M HCl and dilution to 100.0 mL with DMSO. The molecular weights of the regenerated starches are given in Table 3, and these compare very well with those of unmodified potato amylose starch when the starches were prepared in the presence of sodium bicarbonate, while a decrease is evident in the absence of the neutralizing agent, thus, without being restrictive, providing further evidence that the starch remained virtually undegraded by the modification procedure described in this invention. The intrinsic viscosity, [η], was determined by a single-point intrinsic viscosity method on a Viscotec Model 200 GPC in DMSO/water (90/10 vol/vol) at 40° C. using a viscometer detector, and by-passing the GPC column with 50 ft. of tubing (0.01" i.d.). The viscosity data (Table 3) suggests that some degradation did occur, although the decrease in intrinsic viscosity is relatively small (compare [η] for potato amylose with the regenerated starches derived from modified starch samples prepared in Examples 6 and 7). These data confirm that in the absence of a neutralizing agent a significant decrease in intrinsic viscosity is observed (Example 7 versus 8).

EXAMPLE 22

Figure 4A:
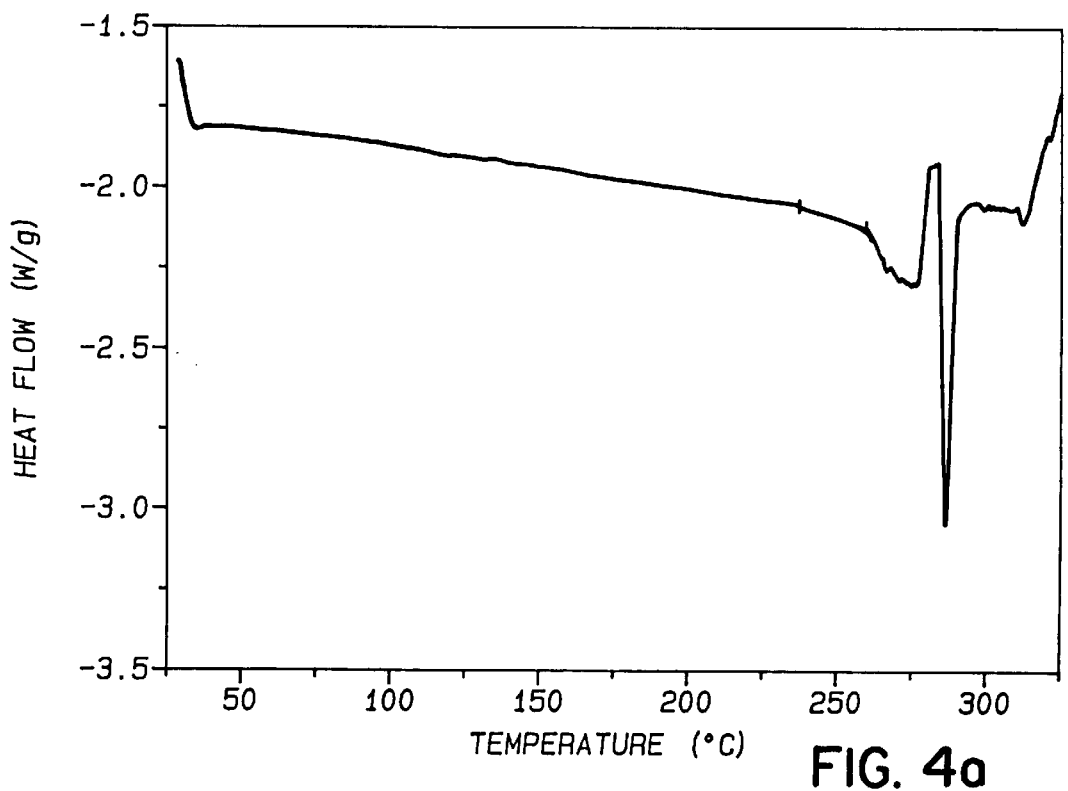
FIG. 4a shows differential scanning calorimetry (at 10 deg/min) of unmodified Hylon VII starch and FIG. 4b shows differential scanning calorimetry under the same conditions for acetylated Hylon VII as prepared in Example 14.
Figure 4B:
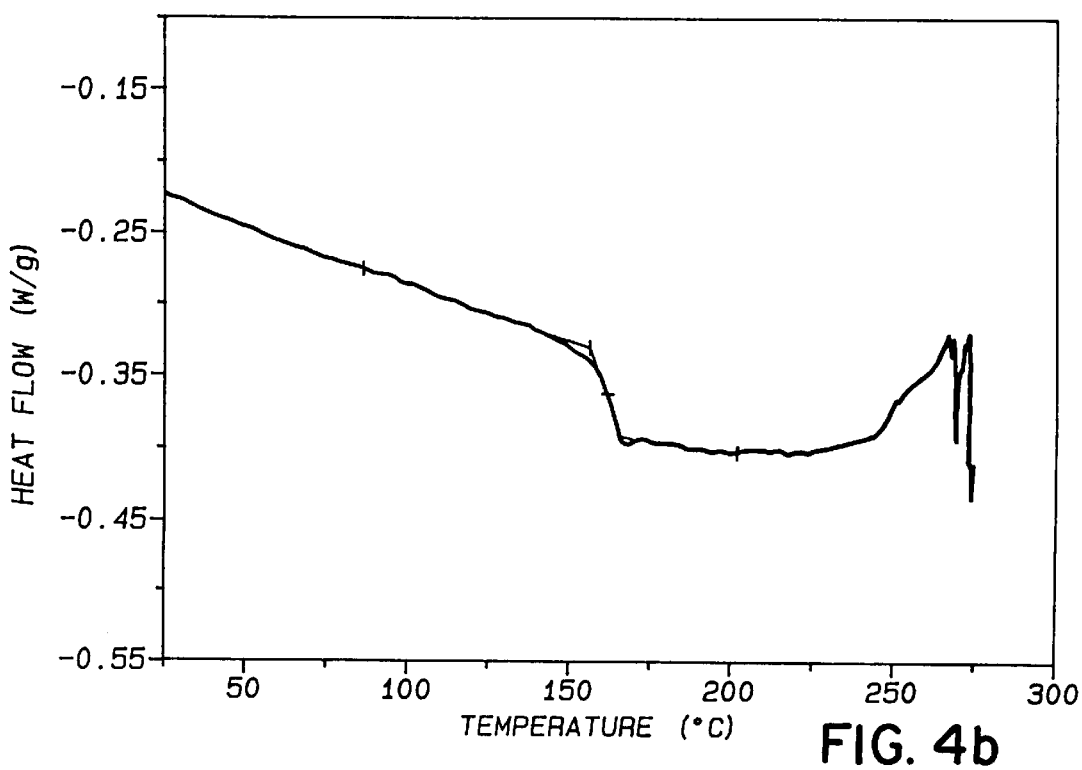

FIG. 4 illustrates the effect of starch modification on thermal properties by comparing scans obtained from Differential scanning Calorimetry (DSC). Whereas the dry unmodified starch in FIG. 4a shows essentially no thermal transitions other than the onset of thermal degradation around 260° C., FIG. 4b clearly reveals a sharp glass transition for the acetylated starch around 155° C. This provides direct evidence for the thermoplastic nature of modified starches described in this invention.

Table 4 further illustrates the effect of plasticizer on thermal properties. The decrease in extruder load observed with increasing plasticizer levels illustrates that improved processability was obtained by using ester plasticizers, such as triacetin and tributyrin. In accordance, a decrease in softening point, Ts, was also observed for triacetin and tributyrin plasticizers, although at 25% butyrin, Ts did not further decrease; the corresponding extruded sample was translucent indicating reduced miscibility, whereas all other samples were transparent indicating good miscibility. The softening point was obtained from Thermal Mechanical Analysis (TMA); for polystyrene, by comparison, a softening point of 111° C. was obtained. The Storage Modulus, E', and the Loss Modulus, E", were obtained from Dynamic Mechanical Analysis (DMA). The decrease observed in the modulus values from 0 to 20% triacetin corresponds closely with a shift in glass transition, thus providing further evidence for the effective plasticization imparted by the ester plasticizers of the solvent-type which are a unique embodiment of this invention. For polystyrene, by comparison, E' and E" were measured to be 106° C. and 117° C., respectively, while a value of 101° C. was obtained for the glass transition temperature, Tg, by DSC.

Figure 5:
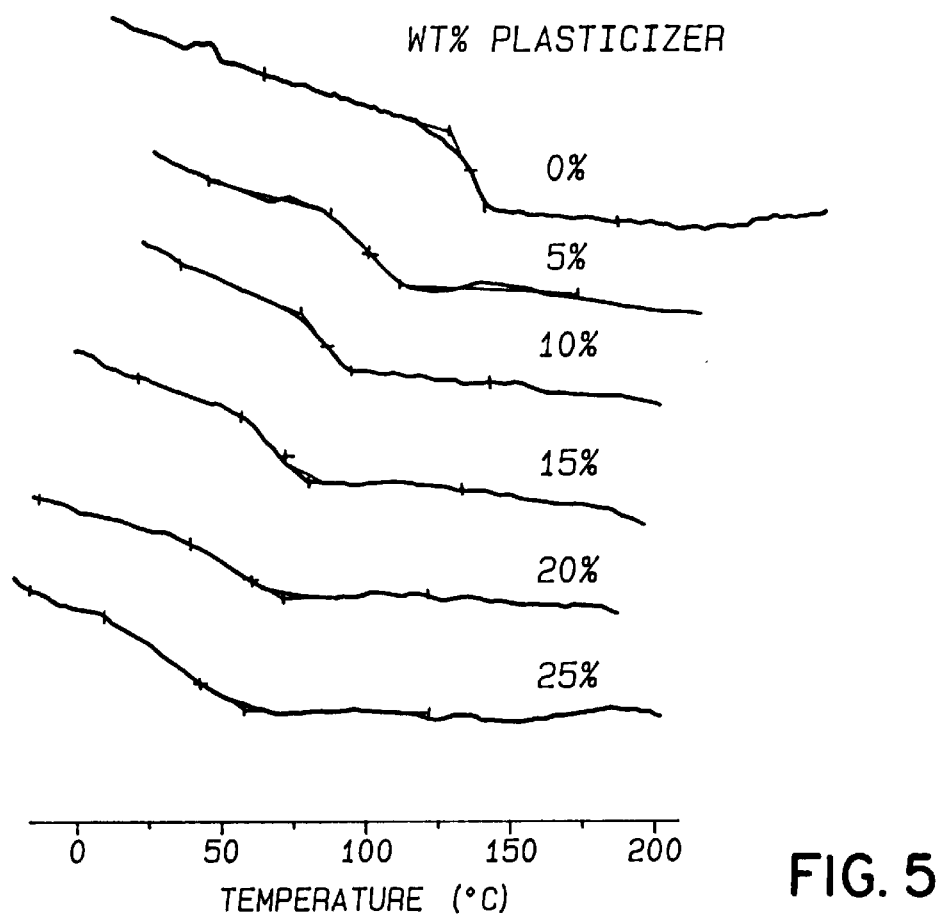
FIG. 5 shows differential scanning calorimetry at 10 deg/min of propionated Hylong VII as prepared in Example 20; solution casting films being prepared with varying levels of diethyl succinate plasticizer.
Figure 6:
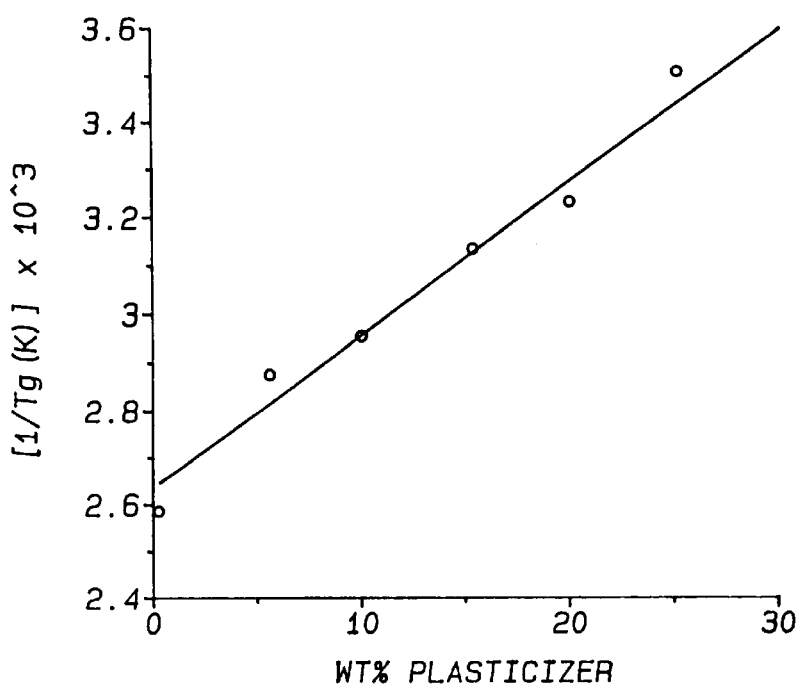
FIG. 6 is a graph showing the effect of diethyl succinate on the glass transition temperature of propionated Hylon VII as prepared in Example 20, Tg onset values from DSC of solution-cast films prepared by casting from acetone solution.

The effect of plasticizer on thermal properties is further illustrated in FIG. 5 for a sample of propionated Hylon VII starch prepared by the method described in Example 20. DSC scans were acquired for solution-cast films prepared with varying levels of diethyl succinate plasticizer; the samples were carefully dried for 10 hrs. at 65° C. in a vacuum oven to remove residual levels of acetone solvent. The level of plasticizer was confirmed by Thermal Gravimetric Analysis (TGA) for the sample containing 25% diethyl succinate. This solution casting technique afforded clear and transparent films which increased in flexibility with increasing plasticizer content. FIG. 5 demonstrates a continuous and significant shift in glass transition temperature with increasing plasticizer level. FIGS. 6 and 7 are Fox-Flory plots of plasticizer composition versus reciprocal Tg for diethylsuccinate and triacetin plasticizers, respectively. The linearity observed in these plots provides further evidence for the effective plasticization imparted by the ester plasticizers of the solvent-type which are a unique embodiment of this invention.

The modified starch polymers prepared in the present invention have an intermediate degree of substitution, preferably ranging from, 0.4 to 2.5 DS, more preferably from 1.0 to 2.0, and most preferably from 1.2 to 1.7 DS. Typically, these modified starch polymers are predominately amorphous polymers. Little or no residual native starch crystallinity remains due to the homogeneous modification process employed. FIG. 8 and Table 5 illustrate that a melting endotherm was observed only for a highly substituted sample of starch propionate (DS=3.0). To further illustrate this, a second scan was obtained as shown at the bottom of FIG. 8, following rapid quenching with liquid nitrogen from the melt. This second scan clearly shows a recrystallization exotherm crystalline nature of this polymer. No crystalline melting endotherms or degrees of substitution (see Table 5 and FIG. 8). All samples were annealed at 105° C. to 20 minutes to facilitate potential crystallization of the polymers, prior to obtaining the first DSC scan.

Without being restrictive, the absence of a new crystalline structure for the starch esters produced by this process probably relates to the range of intermediate degrees of substitution to give non-crystalline copolymers. High DS starch triesters approach the structure of a homopolymer having the needed macromolecular chain regularity required for crystallization. By designing starch esters of intermediate degree of substitution, prepared in a homogeneous modification process the placement of ester groups on the anhydroglucose repeat units is expected to follow a close to statistically random distribution pattern. This results in irregular macromolecular chains, giving rise to novel amorphous thermoplastics with unique properties.

Resin pellets were prepared with modified starch by twin-screw extrusion and injection molded into tensile bars and various molded articles.

EXAMPLE 23

Figure 9:
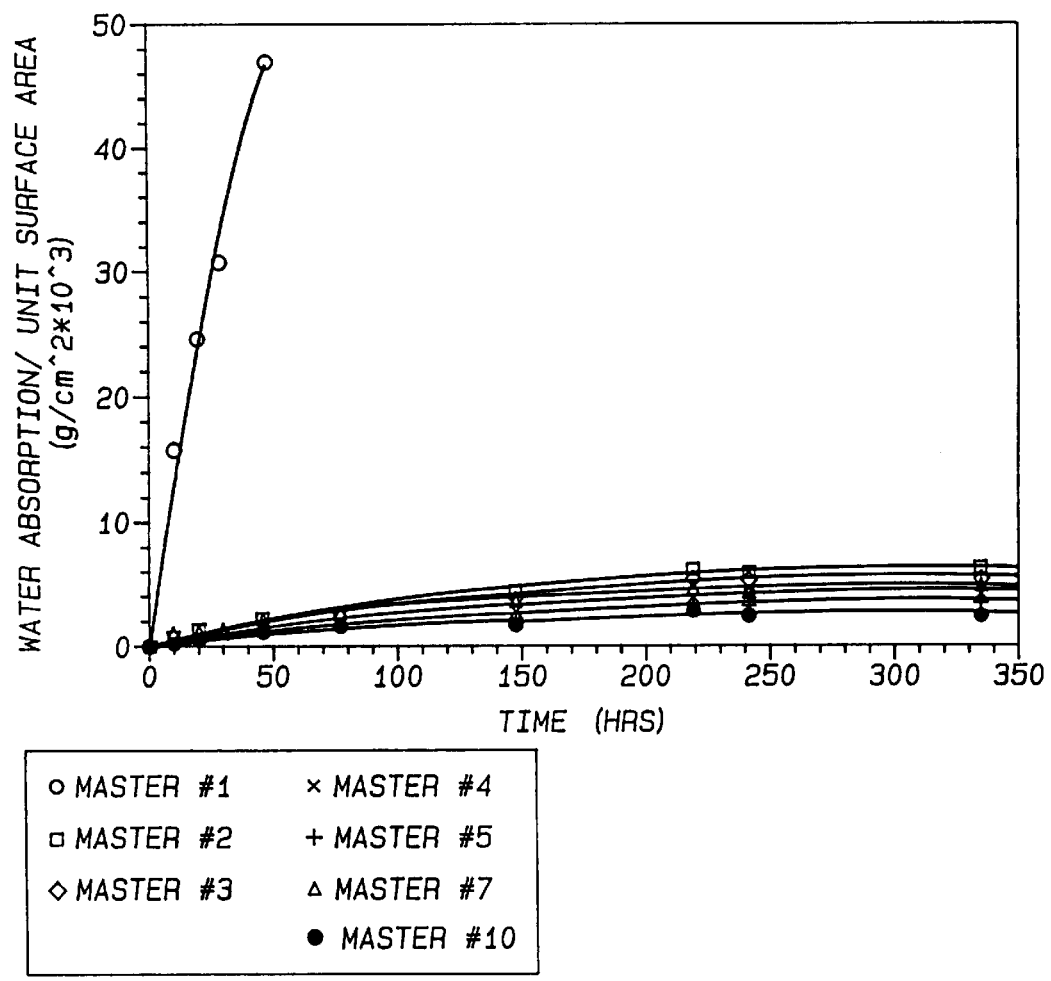

This example presents results of water vapor absorption at a constant and high relative humidity. Tensile bar samples were equilibrated at 50% RH for five days, and stored at 93% RH for the duration of the water absorption experiment. The water absorbed over time for each master batch was determined gravimetrically using 3 tensile test bars, which were normalized to the surface area of the samples. The average values are reported in FIG. 9, which illustrates that the modification of starch described in the present invention results in a significant enhancement of the moisture resistance, as compared for example with an unmodified starch composition (Master #1). This enhanced moisture resistance is a key aspect of the present invention, allowing these materials to serve numerous applications which require this moisture resistance attribute.

EXAMPLE 24

For the preparation of extruded film good mixing of modified starch with plasticizer was found to be essential. Thus, 2 lbs. of an 80/20 wt % mixture of propionated starch powder (prepared by the method in Example 1) with triacetin was extruded using a twin-screw extruder with 1" diameter screws (L/D=14) and dual orifice die. The powder was processed at a temperature profile of 90° C. (zone 1:feed), 100° C. (zone 2), 105° C. (zone 3), and 100° C. (zone 4: Die), and pelletized (or granulated) to give resin pellets reminiscent of conventional commercial plastic pellets. These pellets were subsequently extruded on a single-screw extruder with 1" diameter screw (L/D=24), equipped with an 8" film die and three-stack chill roller and film winder. The temperature profile was 93° C. (zone 1: feed), 121° C. (zone 2), 121° C. (zone 3), and 121° C. (zone 4: Die); the chill rollers were maintained at about 18° C. The resulting film was transparent and flexible having a thickness of 1 to 10 mil depending on the chill roll speed. Water droplets placed on the thermoplastic film beaded up on the surface as a result of the moisture resistance of modified starch described in the present invention. Similar observations of transparency, flexibility and moisture resistance were made for solution-cast films prepared in Example 22.

The products made with the present invention provide new starch-based materials utilizing agricultural resources which can be returned to those resources in an environmentally sound manner. The invention provides new polymeric materials for environmental compatibility. This was achieved by designing and engineering fully biodegradable materials that are thermoplastic yet break down under appropriate environmental conditions in a manner similar to their lignocellulosic counterparts.

The invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

REFERENCES CITED 1. a) "Degradable Materials: Perspectives, Issues and Opportunities", S. A. Barenberg, J. L. Brash, R. Naraynan, A. E. Redpath, Eds., CRC Press, Boca Raton, (1990); b) "Biodegradable Polymers and Plastics", M. Vert, J. Feijen, A. Albertsson, G. Scott, E. Chiellini, Eds., The Royal Society of chemistry, Cambridge, (1992).
2. R. M. Rowell, T. P. Schultz, R. Narayan, Eds., "Emerging Technologies for Materials and Chemicals from Biomass", 200th National Meeting of the American Chemical Society, Washington, D.C., Aug. 26–31, 1990, ACS Symposium Series 476, American Chemical Society, Washington, D.C., (1992).
3. U.S. Pat. No. 4,891,404, R. Narayan, G. T. Tsao, C. J. Biermann, "Biodegradable Graft Copolymers", to Purdue Research Foundation, January 1990.
4. R. Narayan, "Preparation of Corn-Based Plastics for Materials Applications", First Annual Corn Utilization Conference, Jun. 11–12, (1987).
5. R. Narayan, R. P. Neu, "Composite Systems of Lignocellulosics with Synthetic Polymers", *Mat. Res. Soc. Symp. Proc.* Vol. 197, pp. 55–66, (1990); N. Stacy, Z.-J. Lu, Z.-X. Chen, R. Narayan, "Biodegradable Natural-Synthetic Polymer Graft Copolymers, Antec, pp. 1362–1364, (1989).
6. U.S. Pat. No. 5,095,054, G. Lay, J. Rehm, R. F. Septo, M. Thoma, J. P. Sachetto, D. J. Lentz, J. Silbiger, "Polymer compositions Containing Destructurized Starch", to Warner Lambert Co., Mar. 10, 1992.
7. PCT Int. Pat. Appl. WO 92/14782, C. Bastioli, V. Bellotti, A. Montino, "Biodegradable Compositions Based on Starch and Thermoplastic Polymers", Novamont S.P.A., 1992; PCT Int. Pat. Appl. WO 91/02025, C. Bastioli, V. Bellotti, G. Del Tredici, "A Polymer Composition including Destructured Starch and an Ethylene Copolymer", Novamont S.P.A., 1991; (See also WO 91/02023 and WO 91/02024).
8. U.S. Pat. No. 4,863,655, N. L. Lacourse, P. A. Altieri, "Biodegradable Packaging Material and the Method of Preparation Thereof", to National Starch and Chemical Corporation, Sep. 5, 1989.
9. W. Jarowenko, "Acetylated Starch and Miscellaneous Organic Esters", Chapter 4 in "Modified Starches: Properties and Uses", O. B. Wurzburg, Ed., CRC Press, Boca Raton, Fla., (1986). (A review of the physical data and film properties for regular starch- and amylose esters with substitution levels approaching DS=3.0 is included in this reference).
10. Code of Federal Regulations, Title 21, Chapter 1, Part 172, Food Additives Permitted in Food for Human Consumption, Section 172,892, Food Starch-Modified, U.S. Government Printing Office, Washington, D.C., (1981).
11. J. W. Mullen and E. Pascu, "Possible Industrial Utilization of Starch Esters", *Ind. Eng. Chem.,* 35, (1943).
12. C. L. Swanson, R. L. Shogren, G. F. Fanta, S. H. Imam, *J. Environm. Polymer Degrad.* 1 (2), 155–165, (1993).
13. I. A. Wolff, D. W. Olds, G. E. Hilbert, "Triesters of Corn starch, Amylose, and Amylopectin", *Ind. Eng. Chem.,* 43, 911, 1951.
14. C. J. Rivard, W. S. Adney, M. E. Himmel, D. J. Mitchell, T. B. Vinzant, K. Grohmann, L. Moens, H. Chum, "Effect of Natural Polymer Acetylation on the Anaerobic Bioconversion to Methane and Carbon Dioxide", National Renewable Energy Laboratory NREL, *Appl. Biochem. Biotechnol.* 34/35, 725–736, (1992).
15. U.S. Pat. No. 3,795,670, A. M. Mark, C. L. Mehltretter, "Process for making Starch Triacetates", to U.S.D.A., Peoria, Mar. 5, 1974.
16. U.S. Pat. No. 2,372,337, E. Pascu, J. W. Mullen, II, "Method of Preparing Starch Derivatives", to Research Corporation, Mar. 27, 1945.
17. U.S. Pat. No. 2,627,516, R. L. Lohmar, Jr., "Activation and Esterification of Amylaceous Polysaccharides", to U.S.D.A., Feb. 3, 1953.
18. U.S. Pat. No. 2,412,213, M. G. Groen, "Method of Producing Starch Esters", to Alien Property Custodian, Dec. 10, 1946.
19. U.S. Pat. No. 3,720,662, M. M. Tessler, M. W. Rutenberg, "Preparation of Starch Esters", to National Starch and Chemical Corp., Mar. 13, 1973.
20. U.S. Pat. No. 3,839,320, C. D. Bauer, "Method of Preparing Starch Esters", to Anheuser-Busch Inc., Oct. 1, 1974.
21. U.S. Pat. No. 4,129,722, C. P. Iovine, D. K. Ray-Chaudhuri, "Process for the Preparation of High D.S. Polysaccharides", to National Starch and Chemical Corp., Dec. 12, 1978.
22. U.S. Pat. No. 4,387,221, M. M. Tessler, O. B. Wurtzburg, T. A. Dirscherl, "Alkyl- and Alkenyl-Sulfosuccinate Starch Half-Esters, A Method for the Preparation Thereof", to National Starch and Chemical Corp., Jun. 7, 1983.
23. U.S. Pat. No. 4,501,888, J. C. Schmidt, "Process for Producing Esters of Carbohydrate Materials", to E. E. Staley Manufacturing Co., Jun. 20, 1967.
24. U.S. Pat. No. 3,326,893, R. J. Moshy, F. J. Germino, H. W. P. Panzer, "Method for Making Amylose Derivatives", to American Machine and Foundry Co., Jun. 20, 1967.
25. J. W. Mullen II, E. Pacsu, "Starch Studies. Preparation and Properties of Starch Triesters", *Ind. Eng. Chem.* Vol. 34, No. 10, pp. 1209–1217 (1942). (Reference includes a large review of prior art with respect to conditions causing starch degradation).
26. R. S. Higginbotham, W. A. Richardson, "The Effect of Acetylation on the Molecular Chain-Length of Starch", J. Soc. Chem. Ind. Vol. 57, pp. 234–240, (1938).
27. U.S. Pat. No. 2,589,226, J. F. Carson, "Acetylation of Polysaccharides in Formamide", to U.S.D.A., Nov. 22, 1946.
28. U.S. Pat. No. 4,011,392, S. E. Rudolf, R. C. Glowaky, "Mixed Starch Esters and the Use Thereof", to The Sherwin-Williams Co., Mar. 8, 1977.

29. U.S. Pat. No. 4,061,610, R. C. Glowaky S. E. Rudolf, G. P. Bierwagen, "Coating Compositions Containing Starch Half-Esters and Process for Preparing Same", to The Sherwin-Williams Co., Dec. 6, 1977.

30. A. M. Mark, C. L. Mehltretter, "Facile Preparation of Starch Triacetates", Starch/Die Starke Vol. 24, No. 3, pp.73–76, (1972).

31. D. F. Gilmore, S. Antoun, R. W. Lenz, S. Goodwin, R. Austin, R. C. Fuller, "The Fate of 'Biodegradable' Plastics in Municipal Leaf Compost", J. Industr. Microbiol., 10, 199–206, (1992).

32. P. Barak, Y. Coquet, T. R. Halbach, J. A. E. Molina, "Biodegradability of Polyhydroxybutyrate(co-hydroxyvalerate) and Starch-Incorporated Polyethylene Plastic Films in Soils", J. Environ. Qual., 20, 173, (1991).

33. L. R. Krupp, W. J. Jewell, "Biodegradability of Modified Plastic Films in Controlled Biological Environments", Environ. Sci. Technol., 26, 193, (1991).

34. R. Narayan, "Biodegradation of Polymeric Materials (Anthropogenic Macromolecules) During Composting", Proceedings: International Composting Research Symposium, Columbus, Ohio, May 27–29, 1992.

35. R. L. Whistler, Ed., "Methods in Carbohydrate Chemistry", Vol. III—Cellulose, Academic Press, Inc., New York, pp. 201–203, (1964); (See also ASTM Standard Method D 871-72 (Reapproved 1983).

36. Mark, A. M., and C. L. Mehltretter; Stärke 22 (1970), 108.

TABLE 1

Compositions of Master Batches used for Twin-Screw Extrusion, Injection Molding and Tensile Testing

| Components (in PPH) | Master Batch No. | | | | | | | | | |
|---|---|---|---|---|---|---|---|---|---|---|
| | 1 | 2 | 3 | 4 | 5 | 6 | 7 | 8 | 9 | 10 |
| Unmodified Hylon VII Starch | 65 | 0 | 0 | 0 | 0 | 0 | 0 | 0 | 0 | 0 |
| Modified HVII Starch (Example 1) | 0 | 0 | 0 | 0 | 0 | 90 | 0 | 0 | 85 | 59.5 |
| Modified HVII Starch (Example 2) | 0 | 90 | 81 | 63 | 0 | 0 | 85 | 59.5 | 0 | 0 |
| Modified HVII Starch (Example 3) | 0 | 0 | 0 | 0 | 63 | 0 | 0 | 0 | 0 | 0 |
| Glycerol | 35 | 0 | 0 | 0 | 0 | 0 | 0 | 0 | 0 | 0 |
| Triacetin (Glycerol Triacetate) | 0 | 10 $(10\%)^a$ | 9 $(10\%)^a$ | 7 $(10\%)^a$ | 7 $(10\%)^a$ | 10 $(10\%)^a$ | 15 $(15\%)^a$ | 10.5 $(15\%)^a$ | 15 $(15\%)^a$ | 10.5 $(15\%)^a$ |
| Talc | 0 | 0 | 10 | 30 | 30 | 0 | 0 | 30 | 0 | 30 |
| Total Rel. Wt. (g) | 100 | 100 | 100 | 100 | 100 | 100 | 100 | 100 | 100 | 100 |

$^a$) Weight % based on polymer in the master batch

TABLE 2

Tensile Properties of Injection Molded Test Bars Prepared with Biodegradable Starch Ester Compositions

| Master Batch No. | Maximum Tensile Strength (Psi) | | | Young's Modulus (MPsi) | | | % Elongation At Break | | |
|---|---|---|---|---|---|---|---|---|---|
| | 10% RH | 50% RH | 93% RH | 10% RH | 50% RH | 93% RH | 10% RH | 50% RH | 93% RH |
| 1 | $670 \pm 50^a$ $(6)^b$ | $111 \pm 17^a$ $(4)^b$ | $ND^c$ | $0.050 \pm 0.007^a$ $(6)^b$ | $0.005 \pm 0.001^a$ $(4)^b$ | $ND^c$ | $15.5 \pm 1.8^a$ $(6)^b$ | $5.9 \pm 1.5^a$ $(4)^b$ | $ND^c$ |
| 2 | $1700 \pm 178^a$ $(3)^b$ | $2455 \pm 161^a$ $(3)^b$ | $1715 \pm 224^a$ $(6)^b$ | $0.235 \pm 0.013^a$ $(3)^b$ | $0.262 \pm 0.011^a$ $(3)^b$ | $0.164 \pm 0.017^a$ $(6)^b$ | $0.67 \pm 0.06^a$ $(3)^b$ | $1.14 \pm 0.12^a$ $(3)^b$ | $1.13 \pm 0.24^a$ $(6)^b$ |
| 3 | $3232 \pm 343^a$ $(8)^b$ | $3019 \pm 281^a$ $(10)^b$ | $2388 \pm 191^a$ $(7)^b$ | $0.376 \pm 0.021^a$ $(8)^b$ | $0.376 \pm 0.054^a$ $(10)^b$ | $0.396 \pm 0.050^a$ $(7)^b$ | $0.92 \pm 0.16^a$ $(8)^b$ | $1.03 \pm 0.20^a$ $(10)^b$ | $1.14 \pm 0.14^a$ $(7)^b$ |
| 4 | $5141 \pm 327^a$ $(9)^b$ | $4524 \pm 71^a$ $(8)^b$ | $4001 \pm 380^a$ $(9)^b$ | $0.763 \pm 0.037^a$ $(9)^b$ | $0.662 \pm 0.028^a$ $(9)^b$ | $0.624 \pm 0.019^a$ $(9)^b$ | $1.28 \pm 0.29^a$ $(9)^b$ | $1.95 \pm 0.39^a$ $(8)^b$ | $1.57 \pm 0.21^a$ $(9)^b$ |
| 5 | $4619 \pm 230^a$ $(8)^b$ | $4188 \pm 214^a$ $(7)^b$ | $3422 \pm 374^a$ $(7)^b$ | $0.923 \pm 0.123^a$ $(8)^b$ | $0.808 \pm 0.126^a$ $(7)^b$ | $0.836 \pm 0.169^a$ $(7)^b$ | $0.72 \pm 0.12^a$ $(8)^b$ | $0.80 \pm 0.07^a$ $(7)^b$ | $0.71 \pm 0.18^a$ $(7)^b$ |
| 6 | $2292 \pm 158^a$ $(6)^b$ | $2466 \pm 206^a$ $(7)^b$ | $2040 \pm 355^a$ $(7)^b$ | $0.214 \pm 0.024^a$ $(6)^b$ | $0.175 \pm 0.009^a$ $(7)^b$ | $0.122 \pm 0.021^a$ $(7)^b$ | $1.20 \pm 0.04^a$ $(6)^b$ | $1.89 \pm 0.51^a$ $(7)^b$ | $3.01^d \pm 0.11^a$ $(7)^b$ |
| 7 | $2896 \pm 322^a$ $(5)^b$ | $2172 \pm 445^a$ $(6)^b$ | $1710 \pm 119^a$ $(5)^b$ | $0.160 \pm 0.008^a$ $(5)^b$ | $0.198 \pm 0.007^a$ $(6)^b$ | $0.100 \pm 0.011^a$ $(5)^b$ | $2.27 \pm 0.64^a$ $(5)^b$ | $1.78 \pm 0.59^a$ $(6)^b$ | $3.07^d \pm 0.11^a$ $(5)^b$ |
| 8 | $3560 \pm 274^a$ $(10)^b$ | $3499 \pm 74^a$ $(9)^b$ | $2863 \pm 173^a$ $(8)^b$ | $0.538 \pm 0.063^a$ $(10)^b$ | $0.521 \pm 0.056^a$ $(9)^b$ | $0.490 \pm 0.056^a$ $(8)^b$ | $1.40 \pm 0.47^a$ $(10)^b$ | $1.46 \pm 0.48^a$ $(9)^b$ | $1.76 \pm 0.72^a$ $(8)^b$ |
| 9 | $2589 \pm 187^a$ $(5)^b$ | $2401 \pm 131^a$ $(7)^b$ | $1356 \pm 263^a$ $(9)^b$ | $0.186 \pm 0.012^a$ $(5)^b$ | $0.158 \pm 0.033^a$ $(7)^b$ | $0.095 \pm 0.014^a$ $(9)^b$ | $1.65 \pm 0.52^a$ $(5)^b$ | $2.91^d \pm 0.08^a$ $(7)^b$ | $2.79^d \pm 0.37^a$ $(9)^b$ |
| 10 | $3709 \pm 94^a$ $(7)^b$ | $2937 \pm 68^a$ $(8)^b$ | $2513 \pm 50^a$ $(7)^b$ | $0.580 \pm 0.033^a$ $(7)^b$ | $0.457 \pm 0.064^a$ $(8)^b$ | $0.445 \pm 0.028^a$ $(7)^b$ | $1.32 \pm 0.25^a$ $(7)^b$ | $1.88 \pm 0.34^a$ $(8)^b$ | $2.12 \pm 0.34^a$ $(7)^b$ |

$^a$) Standard deviation (1 × s)
$^b$) Values in parenthesis indicate the # of tensile test bars (no jaw breaks) used to calculate the average and standard deviation
$^c$) ND = Not determined due to severe sample deformation, swelling and cracking at high RH
$^d$) % Elongation at yield

TABLE 3

Gel Permeation Chromatography in DMSO (0.01M LiBr) of Unmodified Starches and Starches Regenerated[a] from Modified Starches[b]

| Sample | Anhydride | DS (theor.)[c] | Neutralizing Agent | $Mw^d$ | $Mw^d/Mn^e$ | $[\eta]^f$ (dL/g) |
|---|---|---|---|---|---|---|
| Unmodified Starches[g]: | | | | | | |
| Potato Amylose | NA | 0 | NA | 423,000 | 5.7 | — |
| Hylon VII | NA | 0 | NA | 1,730,000 | 46 | — |
| Regular Corn Starch | NA | 0 | NA | 4,500,000 | 130 | — |
| "Regenerated" Unmodified Starches[a]: | | | | | | |
| Potato Amylose | NA | 0 | NA | 466,000 | 3.2 | 6.1 |
| Hylon VII | NA | 0 | NA | 1,620,000 | 20 | 5.8 |
| Regenerated Modified Starches[a]: | | | | | | |
| Example 6 | Acetic | 2.0 | NaHCO$_3$ | 477,000 | 2.9 | 5.2 |
| Example 7 | Propionic | 2.0 | NaHCO$_3$ | 407,000 | 2.5 | 5.5 |
| Example 8 | Propionic | 2.0 | None | 255,000 | 2.0 | 4.3 |
| Example 9 | Propionic | 2.5 | NaHCO$_3$ | 481,000 | 2.5 | 4.8 |
| Example 10 | Propionic | 2.5 | None | 211,000 | 2.1 | 4.6 |

[a]) Using 1M KOH to saponify starch esters (0.5000 g/100.0 mL; 3 days at 4° C.), followed by neutralization of 10.00 mL with 5M HCl and dilution to 100.0 mL with DMSO
[b]) Modified Starches were prepared from potato amylose by the methods described in Examples 6 to 10
[c]) Theoretical degree of substitution based on the levels of starch and anhydride
[d]) Nominal weight average molecular weight using a Polymer Labs, PL Gel 20 μm (Mixed A) mixed bed column (50 – 10$^6$ Å; 1,000 to 40,000,000 mol. wt.) on a Viscotec Model 200 GPC equipped with differential refractometer (DRI) and viscometer detectors calibrated to narrow dextran molecular weight standards
[e]) Nominal number average molecular weight
[f]) Single-point intrinsic viscosity method on a Viscotec Model 200 GPC in DMSO/water (90/10 vol/vol) at 40° C. determined using the viscometer detector, but by-passing the column with 50 ft. of tubing (0.01" i.d.)
[g]) GPC for these starches was carried by dissolving them in DMSO (0.01M LiBr), without the KOH regeneration pretreatment

TABLE 4

Thermal Properties of Extruded[a] Compositions of Modified Starch[b]

| Plasticizer Content (Wt %) | Relative Extruder Load[c] (%) | Softening Point[d] (°C.) | E', Storage Modulus[e] (°C.) | E", Loss Modulus[e] (°C.) |
|---|---|---|---|---|
| 0% | — | 168 | 116 | 126 |
| 10% Triacetin | 90 | 123 | — | — |
| 15% Triacetin | 80 | 109 | — | — |
| 20% Triacetin | 80 | 95 | 52 | 67 |
| 25% Triacetin | 70 | 73 | — | — |
| 10% Tributyrin | 80 | 113 | — | — |
| 15% Tributyrin | 60 | 104 | — | — |
| 20% Tributyrin | 40 | 93 | — | — |
| 25% Tributyrin | 40 | 99 | — | — |

[a]) Using a twin-screw extruder with 1" diameter screws (L/D = 14) at a temperature profile of 105° C. (zone 1: Feed), 165° C. (zone 2), 165° C. (zone 3), and 155° C. (zone 4: Die)
[b]) Modified Starch was prepared by the method described in Example 2
[c]) Relative compounder load of the twin screw extruder on a scale of 0 to 125%
[d]) Determined by Thermal Mechanical Analysis (TMA)
[e]) E' and E", the Storage and Loss Modulus, resp., were determined by Dynamic Mechanical Analysis (DMA)

TABLE 5

DSC thermal analysis of starch esters with varying degrees of substitution[a]

| Sample # | Anhydride[b] Modification | DS (theor.)[c] | DS (exp.)[d] | DSC Scan # | Tg (°C.) | Tm (°C.) | $\Delta H_m$ (J/g) |
|---|---|---|---|---|---|---|---|
| 1[e] | None | 0 | — | 1[a] | ND[f] | ND[f] | ND[f] |
| 2 | PA | 1.0 | 1.01 | 1[a] | 169 | ND[f] | ND[f] |
| 3 | PA | 1.8 | 1.52 | 1[a] | 128 | ND[f] | ND[f] |
| 4 | PA | 1.9 | 1.77/1.69/1.69 | 1[a] | 137 | ND[f] | ND[f] |
| 5 | PA | 1.9 | 1.81 | 1[a] | 132 | ND[f] | ND[f] |
| 6 | PA/MA | 1.9/0.05 | — | 1[a] | 141 | ND[f] | ND[f] |
| 7 | AA/PA | 1.1/1.2 | — | 1[a] | 135 | ND[f] | ND[f] |
| 8 | PA | 2.3 | 2.52/2.51 | 1[a] | 110 | ND[f] | ND[f] |
| 9 | PA | 2.65 | 2.81/2.52 | 1[a] | 118 | ND[f] | ND[f] |
| 10 | PA | 4.0 | 3.0 | 1[a] | 112 | 218 | 9.0 |
|  |  |  |  | 2[g] | 105 | 214 | 10.4 |

[a]) All samples were pre-annealed for 20 min. at 150° C., cooled slowly to RT and scanned @ 10 deg/min
[b]) Acetic anhydride (AA), propionic anhydride (PA), and maleic anhydride (MA)
[c]) Theoretical degree of substitution (DS) based on the levels of starch and anhydride
[d]) Experimental degree of substitution (DS) determined by titration in triplicate (only the average values are shown) of hydrolyzed samples according to a published method.[35]
[e]) Dried unmodified Hylon VII Starch
[f]) ND = Not detected in the range of RT to 250° C.
[g]) Second scan showed a recrystallization peak at 149° C. (see FIG. 8), in addition to a Tg and a Tm

What is claimed is:

1. A biodegradable product or film containing as the sole starch based polymer a biodegradable, water insoluble, starch ester having a DS of about 1.0 to about 2.5 which has been prepared by reacting purified starch containing at least 50% amylose with an acylation agent and a base catalyst in an aprotic solvent under anhydrous conditions.

2. The product of claim 1 which also contains a plasticizer.

3. The product of claim 1 which also contains a filler.

4. The product of claim 1 in which the acylation agent is acetic anhydride.

5. The product of claim 1 in which the plasticizer is triacetin.

6. The product of claim 1 in which the base catalyst is 4-dimethylamino pyridine (DMAP).

* * * * *